(12) United States Patent
Kashima

(10) Patent No.: US 10,614,068 B2
(45) Date of Patent: Apr. 7, 2020

(54) TRANSACTION SLIP SEARCH METHOD, INFORMATION PROCESSING APPARATUS, AND COMPUTER PRODUCT

(71) Applicant: FUJITSU LIMITED, Kawasaki-shi, Kanagawa (JP)

(72) Inventor: Kazunori Kashima, Chiba (JP)

(73) Assignee: FUJITSU LIMITED, Kawasaki (JP)

(*) Notice: Subject to any disclaimer, the term of this patent is extended or adjusted under 35 U.S.C. 154(b) by 953 days.

(21) Appl. No.: 15/196,309

(22) Filed: Jun. 29, 2016

(65) Prior Publication Data
US 2017/0032469 A1 Feb. 2, 2017

(30) Foreign Application Priority Data

Jul. 31, 2015 (JP) ................................. 2015-152741

(51) Int. Cl.
| | | |
|---|---|---|
| *G06F 16/2455* | (2019.01) | |
| *G06F 16/51* | (2019.01) | |
| *G06F 16/583* | (2019.01) | |
| *G06Q 40/00* | (2012.01) | |

(52) U.S. Cl.
CPC .......... *G06F 16/2455* (2019.01); *G06F 16/51* (2019.01); *G06F 16/583* (2019.01); *G06Q 40/12* (2013.12); *G06Q 40/123* (2013.12)

(58) Field of Classification Search
CPC .. G06F 16/93; G06F 16/9554; G06F 16/9574; G06F 16/313
USPC .................................................. 707/736, 741
See application file for complete search history.

(56) References Cited

U.S. PATENT DOCUMENTS

| | | | | |
|---|---|---|---|---|
| 5,239,165 A | * | 8/1993 | Novak ................ | G06Q 50/34 235/375 |
| 2002/0111960 A1 | * | 8/2002 | Irons ................ | H04N 1/00127 |
| 2009/0067729 A1 | * | 3/2009 | Turkelson ............ | G06K 9/2054 382/224 |

FOREIGN PATENT DOCUMENTS

| | | |
|---|---|---|
| JP | 2002-240397 A | 8/2002 |
| JP | 2003-162643 A | 6/2003 |
| JP | 2005-92660 A | 4/2005 |
| JP | 2008-107462 A | 5/2008 |

OTHER PUBLICATIONS

European Search Report dated Nov. 7, 2016, issued in counterpart European Patent Application No. 16176843.7. (6 pages).
Office Action dated May 7, 2019, issued in counterpart JP Application No. 2015-152741, with machine translation. (6 pages).

* cited by examiner

*Primary Examiner* — James Trujillo
*Assistant Examiner* — Fariborz Khoshnoodi
(74) *Attorney, Agent, or Firm* — Westerman, Hattori, Daniels & Adrian, LLP

(57) ABSTRACT

A transaction slip search method includes identifying, by a computer and according to storage site, a transaction slip satisfying a search condition. The computer identifies the transaction slip when receiving the search condition and by referring to a recording device configured to record associated therein information of transaction slips and information indicating storage sites of the transaction slips. The transaction slip search method further includes associating and outputting, by the computer, information identifying the identified transaction slip and the information indicating a storage site of the identified transaction slip.

12 Claims, 26 Drawing Sheets

FIG. 12

STATEMENT OF DELIVERY

DELIVERY STATEMENT  2006.03.26

NO.

△△ STORE, LTD.
○○○○, KOBE CITY, ○○○-○○○○
TEL (078)×××-××××
FAX (078)×××-××××

CUSTOMER: ○○ ○○
ITEMS DELIVERED AS INDICATED BELOW

| | PRODUCT | NO. OF UNITS | UNIT PRICE | AMOUNT (EXCL. TAX) | AMOUNT (INCL. TAX) |
|---|---|---|---|---|---|
| 1 | KUSATAKI | 50 | 1,050 | 52500 | — |
| 2 | SHIPPING | | | 1160 | — |
| 3 | | | | | |
| 4 | | | | | |
| 5 | | | | | |
| 6 | | | | | |
| TOTAL | | | | ¥53660 | |

BANK TRANSFER FORM AND RECEIPT

BANK TRANSFER PAYMENT RECEIPT

| ACCOUNT NUMBER | 0 1 2 3 4 5  6 7 8 9 0 |
|---|---|
| PAYEE | △△ STORE, LTD |
| AMOUNT | ¥53660 |
| PAYER | ○○ ACCOUNTING FIRM |
| CHARGES | DATE OF RECEIPT |
| SPECIAL HANDLING | 18-04-03 □□ POST OFFICE (132) |

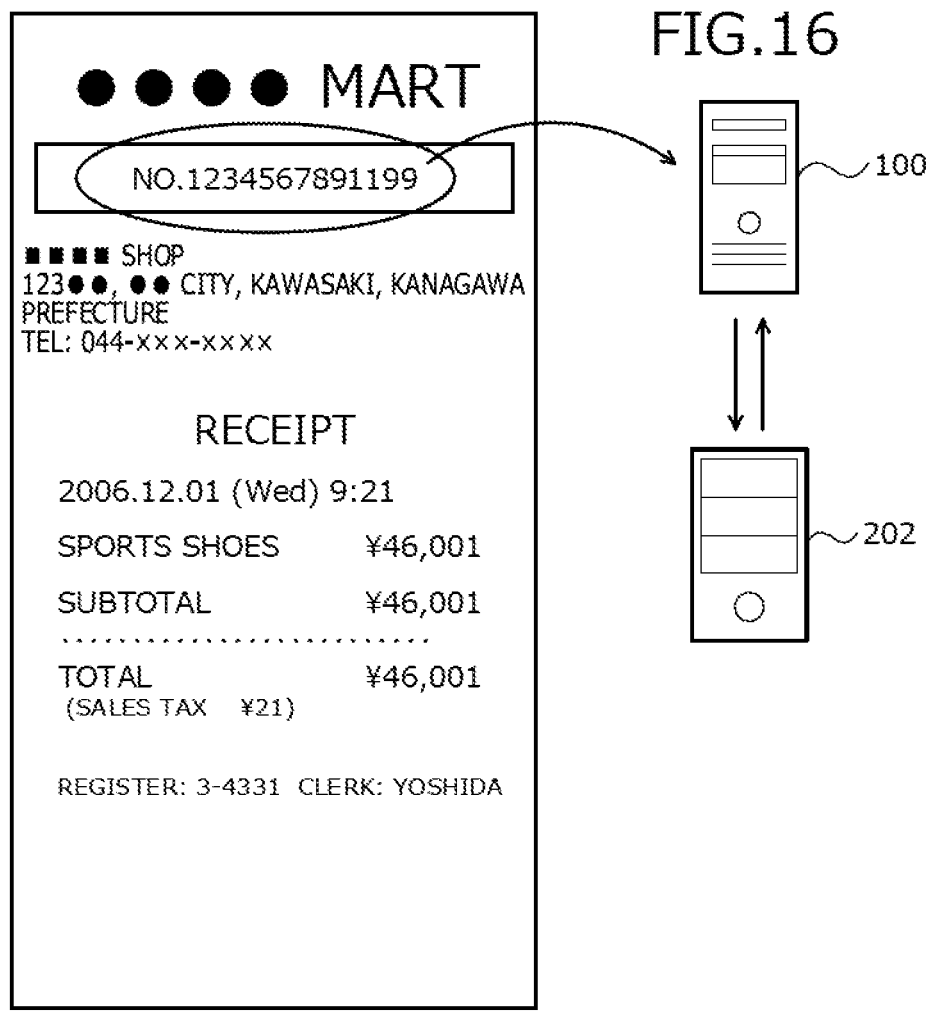

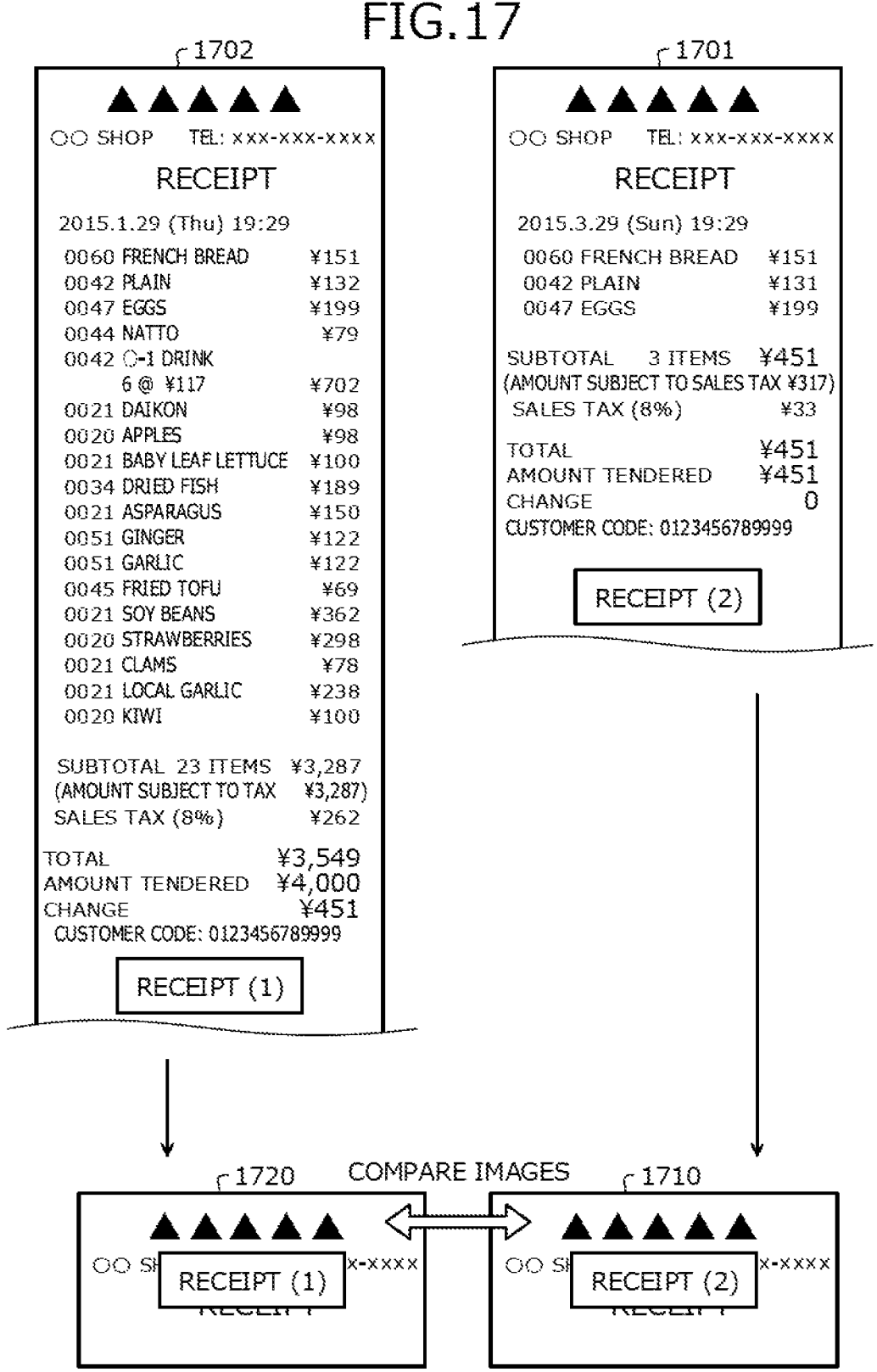

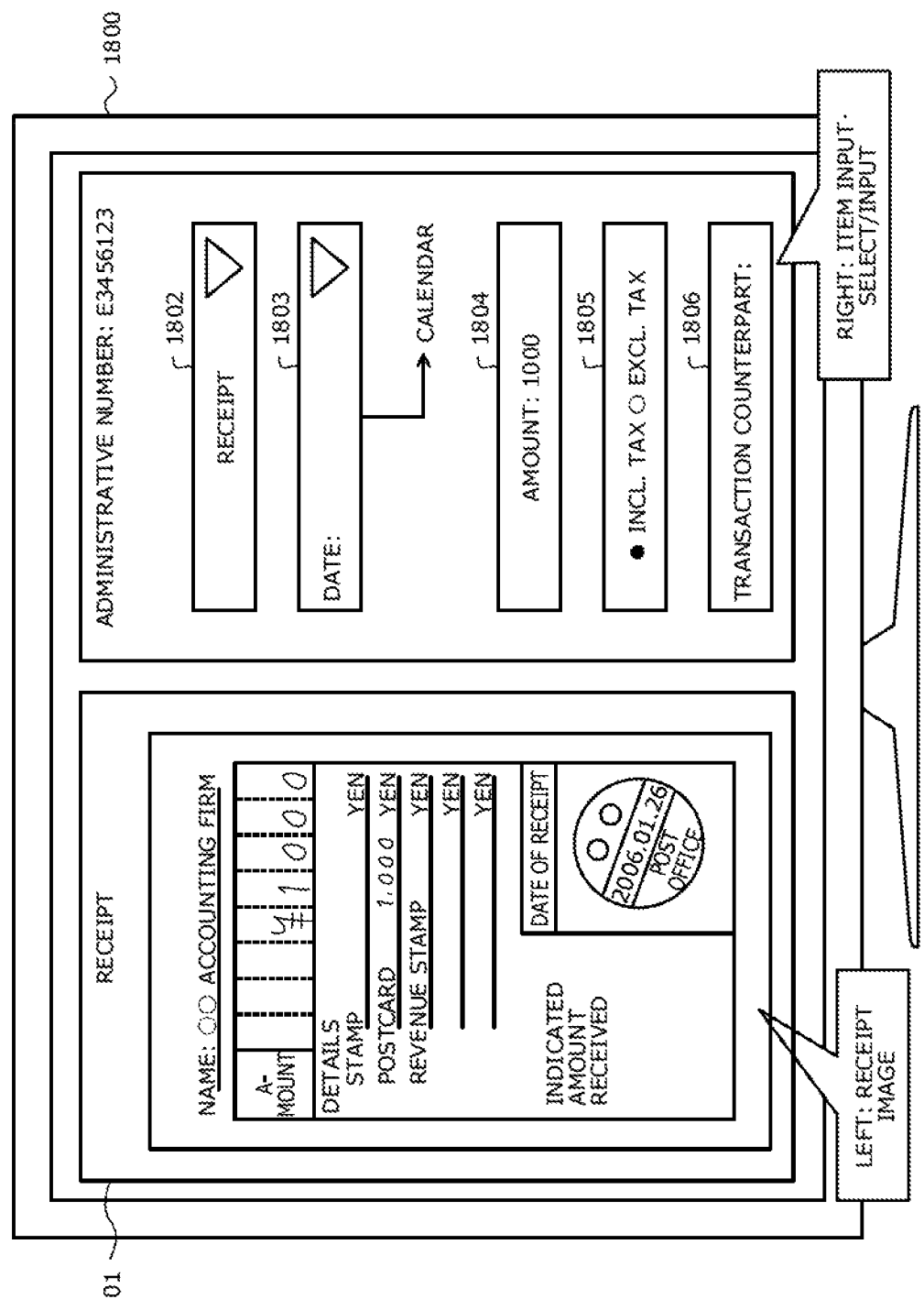

FIG.19

JOURNAL SCREEN 1900

COMPANY NAME: COFFEE VENDER A

1901

| DATE | ADMINIS-TRATIVE NUMBER | DEBIT ACCOUNT NAME | DEBIT AMOUNT (YEN) | CREDIT ACCOUNT NAME | CREDIT AMOUNT (YEN) | NOTES | TRANS-ACTION COUNTER-PART | STORAGE SITE | RECORDING AREA |
|---|---|---|---|---|---|---|---|---|---|
| 2006/01/13 | E3123454 | EMPLOYEE BENEFIT EXPENSE | 10,000 | CASH | 10,000 | | RESTAU-RANT 3 | LOCKER NO.B1/SHELF NO.123/SEALED DOCUMENT NO.4545 |  |
| 2006/01/14 | E3123455 | MISCEL-LANEOUS COST | 7,000 | CASH | 7,000 | | CITY RESEARCH GROUP | LOCKER NO.B1/SHELF NO.123/SEALED DOCUMENT NO.4545 |  |
| 2006/01/14 | E3123456 | CONSUM-ABLE SUPPLY COST | 8,500 | CASH | 8,500 | | K FIRM | LOCKER NO.B1/SHELF NO.123/SEALED DOCUMENT NO.4545 |  |

- ● PERIOD: 2006.01.01 ~ 2006.05.31 — 1902
- ● JOURNAL ACCOUNT: EMPLOYEE BENEFIT EXPENSE ▼ ● DEBIT ○ CREDIT — 1903
- ● AMOUNT : 30,000 — 1904
- ○ ADMINISTRATIVE NUMBER: — 1905

[TRANS-ACTION SLIP SEARCH] — 1906

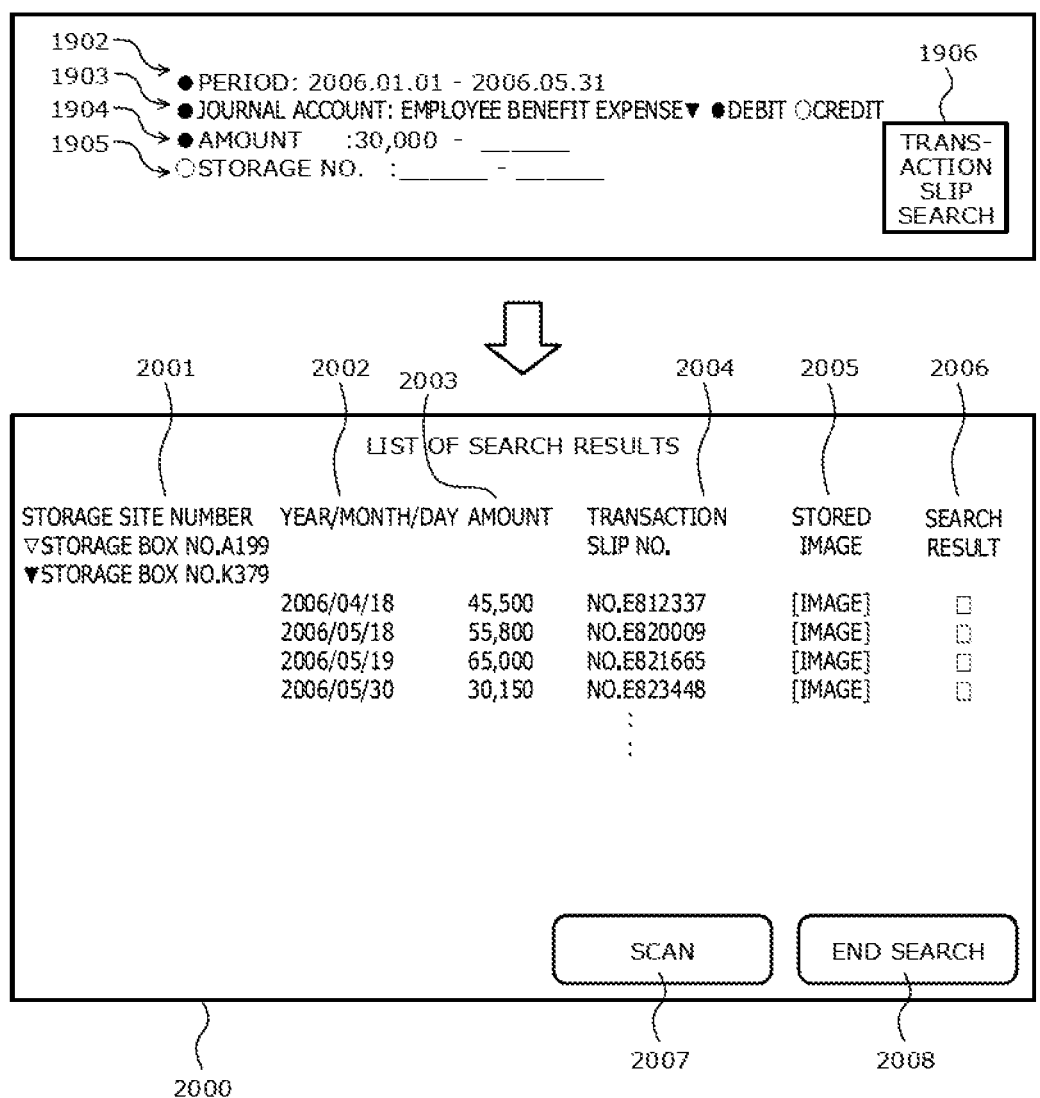

TRANSACTION SLIP SEARCH METHOD, INFORMATION PROCESSING APPARATUS, AND COMPUTER PRODUCT

CROSS REFERENCE TO RELATED APPLICATIONS

This application is based upon and claims the benefit of priority of the prior Japanese Patent Application No. 2015-152741, filed on Jul. 31, 2015, the entire contents of which are incorporated herein by reference.

FIELD

Embodiments discussed herein relate to a transaction slip search method, an information processing apparatus, and a computer product.

BACKGROUND

Enforcement regulations under tax laws require that original transaction slips, such as receipts and billing statements forming the basis of records in accounting books retained by a company as a tax payer, be maintained for at least a predetermined period of time in storage such as in a storage site like corrugated cardboard boxes and file cabinets in a warehouse. When accounting books are checked for improper or fraudulent recording, the original transaction slips such as receipts and billing statements are searched and therefore, are removed from storage for collation with the records in the accounting books.

According to a related technique, for example, a manuscript is read in as an image that is subject to optical character recognition and searched, whereby a character string that is hit by a search keyword is retrieved. A highlighting process is applied to the position of the character string in the manuscript, and the result of the highlighting process is printed superimposed on the manuscript. For example, according to another technique, number information to identify an address card to be searched for is input by a user operation, the number information of plural address cards is read in, and matching between the read in number information and the input number information is determined. According to another technique, a payment notice is read in using an overhead reader (OHR), a payment notice ID is identified based on the obtained image data, the payment notice type representing a processing class of the payment notice is determined based on the identified payment notice ID, and the payment notice type is printed on the back of the payment notice (see, e.g., Japanese Laid-Open Patent-Publication Nos. 2008-107462, 2002-240397, and 2003-162643).

SUMMARY

According to an aspect of an embodiment, a transaction slip search method includes identifying, by a computer and according to storage site, a transaction slip satisfying a search condition. The computer identifies the transaction slip when receiving the search condition and by referring to a recording device configured to record associated therein information of transaction slips and information indicating storage sites of the transaction slips. The transaction slip search method further includes associating and outputting, by the computer, information identifying the identified transaction slip and the information indicating a storage site of the identified transaction slip.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 is an explanatory diagram of an example of details described in a transaction slip 1200;

FIG. 16 is an explanatory diagram of one example of operation to update accounting book information based on a corporation identification number;

FIG. 17 is an explanatory diagram of one example of operation to update the accounting book information based on a logo;

FIG. 18 is an explanatory diagram of one example of operation to receive input of information concerning details described in a transaction slip 120;

FIG. 19 is an explanatory diagram of one example of operation to receive input of search conditions;

FIG. 20 is an explanatory diagram of one example of operation to display a storage site 130 storing the transaction slip 120;

DESCRIPTION OF THE INVENTION

With conventional techniques, however, searching transaction slips stored at storage sites, for a transaction slip that satisfies a predetermined condition is a heavy burden. For example, among plural storage sites, when the storage site storing the transaction slip that satisfies the predetermined condition is not known, all the transaction slips stored in each of the storage sites have to be checked to find the transaction slip that satisfies the predetermined conditions.

Embodiments of a transaction slip search method, an information processing apparatus, and a transaction slip search program according to the present invention will be described in detail with reference to the accompanying drawings.

Figure 1:
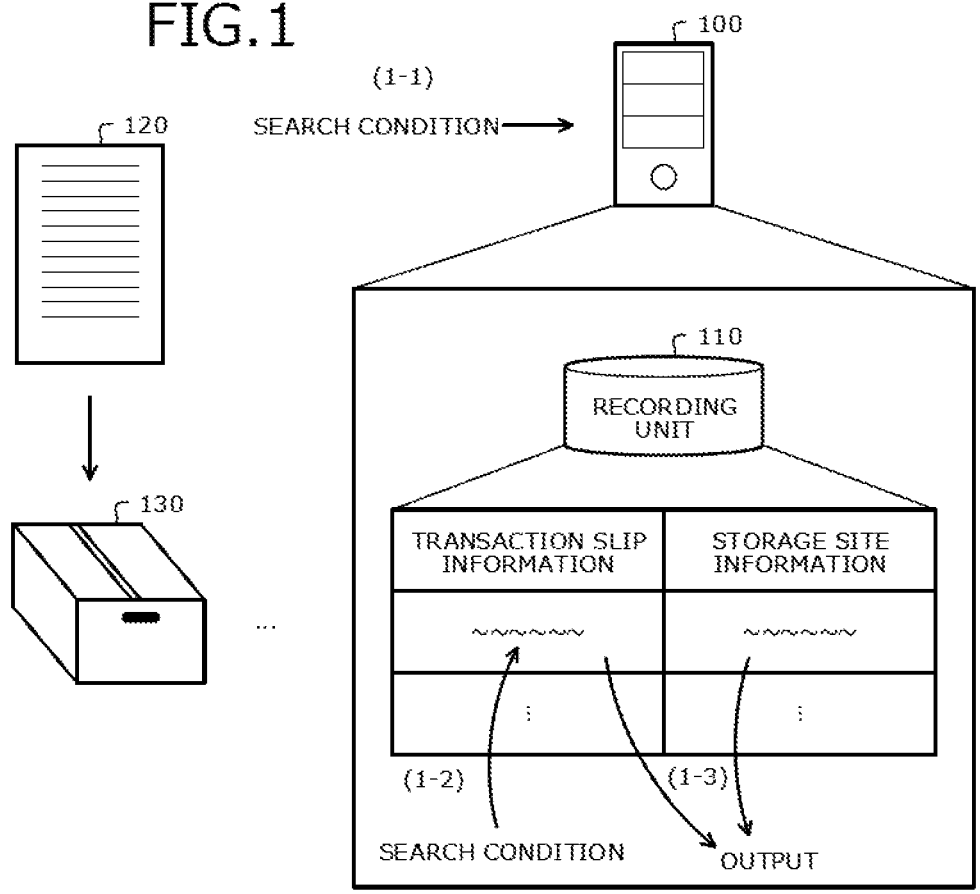
FIG. 1 is an explanatory diagram of an example of a transaction slip search method according to an embodiment.

FIG. 1 is an explanatory diagram of an example of a transaction slip search method according to an embodiment. In FIG. 1, an information processing apparatus 100 includes a recording unit 110 that records associated therein, information concerning a transaction slip 120 and information indicating a storage site 130 of the transaction slip 120. The information processing apparatus 100 is a computer that refers to the recording unit 110 and identifies the storage site 130 of the transaction slip 120.

The transaction slip 120 is a paper transaction slip describing transaction expenses, income, details, and the like. The transaction slip 120 is, for example, a receipt or a billing statement issued by a company or a government agency. The transaction slip 120 is, for example, a handwritten receipt, a receipt issued by a retail store, or automatic payment transfer form for utility bill. The material of the transaction slip 120 need not be paper. The information of the transaction slip 120 includes, for example, information identifying the transaction slip 120 and information concerning the details described in the transaction slip 120. The information identifying the transaction slip 120 is, for example, a character string representing the transaction slip 120. The information identifying the transaction slip 120 is, for example, an administrative number that is assigned to the transaction slip 120 and that is printed on the back of the transaction slip 120. The storage site 130 is a site where the transaction slip 120 is stored. The storage site 130 is, for example, a corrugated cardboard box or a file cabinet in a warehouse. The information indicating the storage site 130 is a storage site number assigned to the corrugated cardboard box or the file cabinet in the warehouse, or the like.

In observing tax laws, a company stores an enormous number of transaction slips 120 for a long period of time such as seven years, in plural storage sites 130 such as plural corrugated cardboard boxes, plural file cabinets, and the like. Therefore, searching for a transaction slip 120 that satisfies a predetermined condition is a heavy burden. For example, when information concerning the details described in the transaction slip 120, information indicating the storage site 130 of the transaction slip 120, and the like are not managed in a company, the storage site 130 that stores the transaction slip 120 satisfying the predetermined condition is difficult to identify. Therefore, searching for the transaction slip 120 that satisfies a predetermined condition is a heavy burden.

For example, when the National Tax Agency conducts a tax audit, all transaction slips 120 such as receipts and billing statements satisfying predetermined conditions must be presented and are collated with the records in the accounting books of the company. Therefore, searching work is performed. In this case, even when each of the storage sites 130 is labeled to indicate the period of the transaction slips 120 stored therein, in which storage site 130 transaction slips 120 that pertain to a predetermined monetary value or greater, or transaction slips 120 of a particular type, etc. are stored and how many are stored therein is not known. Therefore, transaction slips 120 that pertain to a predetermined monetary value or greater, or transaction slips 120 of a particular type, etc. are sought by visually checking the transaction slips 120 and consequently, searching for transaction slips is a heavy burden.

In addition, transaction slips 120 stored by group companies may also be sought, whereby the burden increases. Consequent to a need for horizontal checking, other storage sites 130 may further be checked for the presence of transaction slips 120 satisfying the predetermined conditions, whereby the burden further increases. In the present embodiment, a search method for the transaction slips 120 will be described that can reduce the burden of searching for transaction slips 120.

In the example depicted in FIG. 1, the transaction slip 120 is stored in any one of plural corrugated cardboard boxes and is placed in a warehouse. The transaction slip 120 describes, for example, a transaction counterpart, a transaction date, and a transaction amount. For example, information indicating the storage site 130 is assigned to the storage site 130 and the assigned information indicating the storage site 130 is printed on the storage site 130.

(1-1) The information processing apparatus 100 receives search conditions. The search conditions are conditions to be satisfied by the transaction slip 120 sought by a user of the information processing apparatus 100. The search conditions are, for example, conditions concerning a transaction counterpart, a transaction date, a transaction amount, and a transaction slip type described in the transaction slip 120. For example, the information processing apparatus 100 receives the search conditions such as a period of the transaction date of the transaction slip 120, the type of the transaction slip 120, and the like by operational input by the user of the information processing apparatus 100.

(1-2) The information processing apparatus 100 refers to the recording unit 110 and identifies the transaction slips 120 that satisfy the received search conditions and the storage sites 130 of the transaction slips 120. For example, the information processing apparatus 100 searches the information of the transaction slips 120 recorded in the recording unit 110, for the information of transaction slips 120 that correspond to transaction dates included in the period received as a search condition and the type received as a search condition. The information processing apparatus 100 identifies the information of the transaction slips 120 that correspond to the search conditions and identifies information indicating the storage site 130 that corresponds to the information of the transaction slips 120.

(1-3) The information processing apparatus 100 associates and outputs the information that identifies among the identified transaction slips 120, a transaction slip stored at an identified storage site 130 and the information indicating the identified storage site 130. For example, on a display not depicted and included in the information processing apparatus 100, the information processing apparatus 100 displays for each piece of information indicating an identified storage site 130, information identifying a transaction slip 120 stored in the storage site 130. The information processing apparatus 100 may further display the information concerning the details described in the transaction slip 120 together with the information identifying the transaction slip 120.

As described, according to the information processing apparatus 100, information indicating transaction slips 120 that satisfy search conditions can be output collectively for each of the storage sites 130 that store therein transaction slips 120 satisfying the search conditions, thereby giving notification to the user of the information processing apparatus 100. The user of the information processing apparatus 100 can thus easily identify among the plural storage sites 130, the storage sites 130 that store the transaction slips 120 that satisfy the search conditions and the burden of searching for the transaction slips 120 can be reduced. The user of the information processing apparatus 100 can understand how many transaction slips 120 satisfying the search conditions are stored in each of the plural storage sites 130, and can collectively take out the transaction slips 120 that are stored in a single storage site 130 and satisfy the search conditions.

Based on the output information identifying the transaction slips 120, the user of the information processing apparatus 100 can search the plural transaction slips 120 stored in the storage sites 130, for the transaction slips 120 satisfying the search conditions. The user of the information processing apparatus 100 can therefore suppress the occurrence of mistaken selection and overlooking of transaction slips 120 satisfying the search conditions. When no transaction slip 120 satisfying the search conditions is present in any storage site 130, the user of the information processing apparatus 100 can determine whether no transaction slip 120 satisfying the search conditions was stored or the transaction slip 120 satisfying the search conditions may be lost.

The user of the information processing apparatus 100 need not visually determine whether a transaction slip satisfying the search conditions is stored despite no transaction slip satisfying the search conditions being stored in the storage site, and the burden of searching can be reduced. As a result, the information processing apparatus 100 can reduce the burden of searching for a transaction slip 120 and can reduce personnel costs, temporal costs, monetary costs, and the like associated with a tax audit by the National Tax Agency, and the like.

One example of a transaction slip seeking system 200 to which the information processing apparatus 100 depicted in FIG. 1 is applied will be described.

Figure 2:
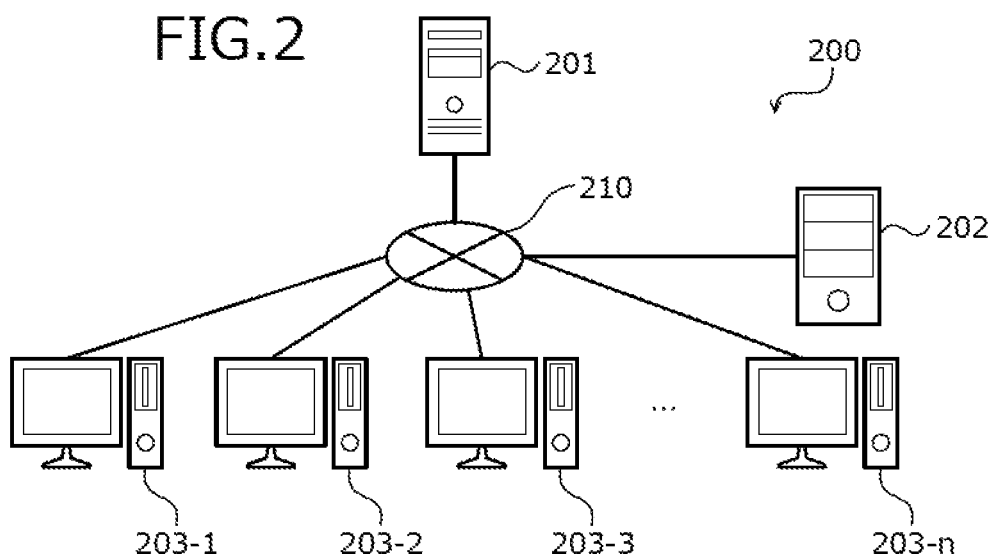
FIG. 2 is an explanatory diagram of one example of a transaction slip seeking system 200.

FIG. 2 is an explanatory diagram of one example of the transaction slip seeking system 200. In FIG. 2, the transaction slip seeking system 200 includes a managing apparatus 201, an information accumulating apparatus 202, and client apparatuses 203-1 to 203-*n* ("n" is a natural number equal to or greater than two). In the following description, the client apparatuses 203-1 to 203-*n* may be described as "client apparatuses 203".

In the transaction slip seeking system 200, the managing apparatus 201, the information accumulating apparatus 202, and the client apparatuses 203 are connected to each other through a wired or a radio network 210. The network 210 is, for example, a local area network (LAN), a wide area network (WAN), or the Internet.

The managing apparatus 201 is, for example, a server, or a personal computer (PC). The managing apparatus 201 is, for example, a server that is installed in a company (a taxpayer) and that is used by the employees of the company. The information accumulating apparatus 202 is, for example, a server or a PC. The information accumulating apparatus 202 is, for example, a server owned by a regulatory authority such as the National Tax Agency.

The client apparatuses 203 are, for example, PCs, notebook PCs, tablet PCs, and smartphones. The client apparatuses 203 are, for example, PCs installed in a company (taxpayer) and used by the employees and the like of the company. The transaction slip seeking system 200 may include an independent scanner configured to communicate with the managing apparatus 201 and the client apparatuses 203 through the network 210. Here, an example of hardware configuration will be described for the managing apparatus 201, the information accumulating apparatus 202, and the client apparatus 203 with reference to FIGS. 3 to 9, respectively.

An example of hardware configuration of the managing apparatus 201 included in the transaction slip seeking system 200 depicted in FIG. 2 will be described with reference to FIG. 3.

Figure 3:
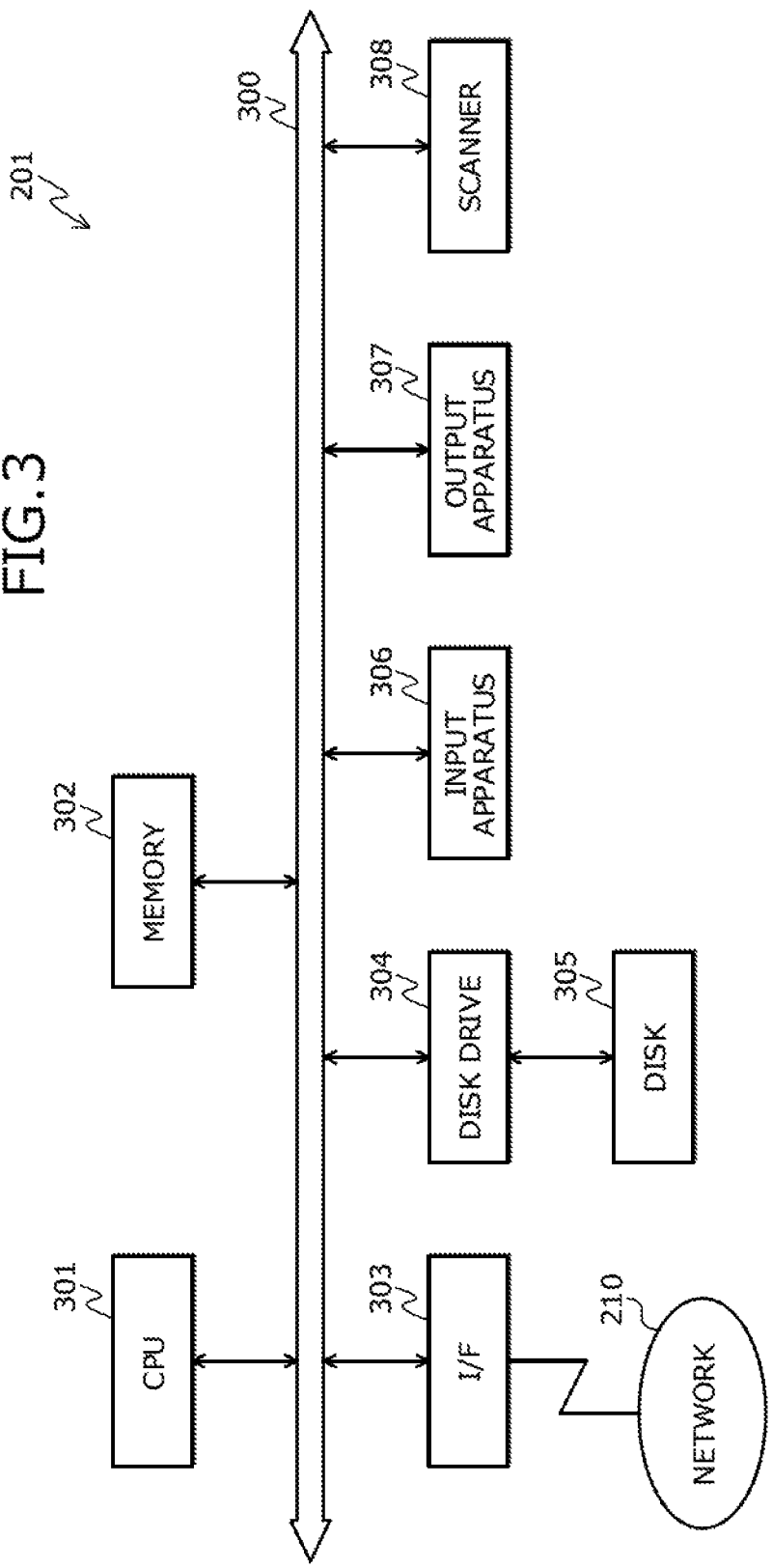
FIG. 3 is a block diagram of an example of hardware configuration of a managing apparatus 201.

FIG. 3 is a block diagram of an example of hardware configuration of the managing apparatus 201. In FIG. 3, the managing apparatus 201 includes a central processing unit (CPU) 301, memory 302, an interface (I/F) 303, a disk drive 304, a disk 305, an input apparatus 306, an output apparatus 307, and a scanner 308. These components are connected to each other by a bus 300.

The CPU 301 supervises the overall control of the managing apparatus 201. The memory 302 includes, for example, read only memory (ROM), random access memory (RAM), and flash ROM. For example, the flash ROM and the ROM record various programs and the RAM is used as a work area of the CPU 301. The programs recorded in the memory 302 are loaded to the CPU 301, whereby a coded process is executed by the CRU 301. The memory 302 records various tables such as, for example, a journal table 400 described later with reference to FIG. 4, a logo information table 500 described later with reference to FIG. 5, and a storage information table 600 described later with reference to FIG. 6.

The I/F 303 is connected to the network 210 through a communication line and is connected to other computers through the network 210. Other computers include, for example, the information accumulating apparatus 202 and the client apparatuses 203 depicted in FIG. 2. The I/F 303 administers an internal interface with the network 210 and controls the input and output of data with respect to the other computers. For example, a modem or a LAN adaptor may be employed as the I/F 303.

The disk drive 304, under the control of the CPU 301, controls the reading and writing of data with respect to the disk 305. The disk drive 304 is, for example, a magnetic disk drive or an optical disk drive. The disk 305 is non-volatile memory recording data written thereto under the control of the disk drive 304. Instead of the memory 302, the disk 305 may record various tables therein such as the journal table 400 described later with reference to FIG. 4, the logo information table 500 described later with reference to FIG. 5, and the storage information table 600 described later with reference to FIG. 6. The disk 305 is, for example, a magnetic disk or an optical disk.

The input apparatus 306 is an interface that inputs various types of data by a user operation via a keyboard or a touch panel. The input apparatus 306 may be a pointing device such as a mouse. The output apparatus 307 is an interface that outputs data according to an instruction of the CPU 301. The output apparatus 307 is, for example, a display that displays data such as a document, an image, and functional information in addition to a cursor, an icon, and a toolbox. The output apparatus 307 may be a printer.

The scanner 308 scans an object and detects a target object. For example, the scanner 308 recognizes the administrative number printed on the back of a transaction slip 120 by scanning the transaction slip 120, and detects the transaction slip 120 searched for based on the recognized administrative number. The scanner 308 may capture image data of the transaction slips 120 by scanning the transaction slip 120 and may detect the transaction slip 120 searched for based on the captured image data. The scanner 308 captures image data of an object by scanning the object and prints administrative information that ties the object to the storage site 130. For example, the scanner 308 captures image data of the transaction slip 120 by scanning the transaction slip 120 and prints information identifying the transaction slip 120 on the back of the transaction slip 120.

Among the components above, configuration of the managing apparatus 201 may omit, for example, the disk drive 304 and the disk 305. The managing apparatus 201 may include, for example, a solid state drive (SSD) and semiconductor memory in addition to the above components thereof. The managing apparatus 201 may include an SSD, a semiconductor memory, and the like instead of the disk drive 304 and the disk 305.

Although a case is described above where the managing apparatus 201 includes the scanner 308, configuration is not limited hereto. For example, the managing apparatus 201 may be connected to an external scanner through the network 210, and may receive the scanning result of the transaction slip 120, the detection result of the transaction slip 120, and the like, from the external scanner.

One example of the content of the journal table 400 will be described with reference to FIG. 4. The journal table 400 is realized by, for example, a recording area such as the memory 302 and the disk 305 depicted in FIG. 3, or the like.

Figure 4:
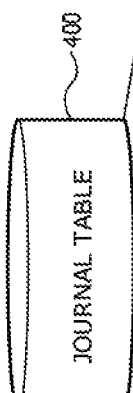
FIG. 4 is an explanatory diagram of one example of the content of a journal table 400.

FIG. 4 is an explanatory diagram of one example of the content of the journal table 400. As depicted in FIG. 4, the journal table 400 has fields for transaction dates, administrative numbers, debit account names, debit amounts, credit account names, credit amounts, notes, the names of transaction counterparts, storage site numbers, and image recording areas, associated with a field for company names. For each transaction slip 120, information is set into each of the fields, whereby the journal table 400 records accounting book information as a record 400-$a$. "$a$" is a natural number.

A company name is the name of a company that manages the transaction slip 120. The name of a company is, for example, a corporation name. A transaction date is the date of the transaction that corresponds to the transaction slip 120. An administrative number is information identifying the transaction slip 120. An administrative number is, for example, a character string that represents the transaction slip 120 and is printed on the back, of the transaction slip 120. A debit account name is the name of a debit account representing transaction details of the transaction corresponding to the transaction slip 120. The name of the debit account is a name that represents transaction details such as an increase of an asset, a decrease of debt, a decrease of capital, or a cost. The name of the debit account is, for example, cash, material cost, miscellaneous cost, consumable supply cost, employee benefit expense, and travel and transportation cost. A debit amount is an amount that, corresponds to the debit account representing transaction details of the transaction corresponding to the transaction slip 120.

A credit account name is the name of a credit account representing transaction details of the transaction corresponding to the transaction slip 120. The name of the credit account is a name that represents transaction details such as a decrease of an asset, an increase of debt, an increase of capital, or profit. The name of the credit, account is, for example, cash or merchandise. A credit amount is an amount that corresponds to the credit account representing the transaction details of the transaction corresponding to the transaction slip 120. A note is a transaction note that represents transaction details of the transaction corresponding to the transaction slip 120. A name of a transaction counterpart is the name of the transaction counterpart of the transaction corresponding to the transaction slip 120. The name of the transaction counterpart is, for example, the name of a company.

A storage site number is information assigned to and indicating the storage site 130 storing the original of the transaction slip 120. An image recording area is the address of a recording area recording therein the image data of the transaction slip 120. For example, the record 400-1 is accounting book information indicating that the transaction slip 120 represented by the administrative number "E3123454" is a transaction slip 120 that is stored in the storage site 130 represented by the storage site number "A099".

One example of the content of the logo information table 500 will be described with reference to FIG. 5. The logo information table 500 is realized by, for example, a recording area such as the memory 302 or the disk 305 depicted in FIG. 3.

Figure 5:
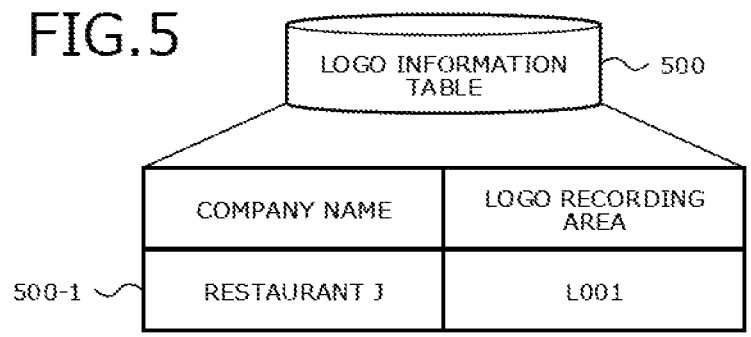
FIG. 5 is an explanatory diagram of one example of the content of a logo information table 500.

FIG. 5 is an explanatory diagram of one example of the content of the logo information table 500. As depicted in FIG. 5, the logo information table 500 has fields for logo recording areas, associated with a field for company names. For each company that may be a transaction counterpart, information is set into the associated field, whereby the logo information table 500 records logo information as a record 500-$b$. "$b$" is a natural number.

A company name is the name of a company that may be a transaction counterpart. A company name is, for example, a corporation name. A logo recording area is the address of a recording area recording therein the image data of the logo of a company that may be a transaction counterpart. For example, the record 500-1 is logo information indicating that the image data of the logo recorded at an address "1001" is the image data of the logo of the company having the company name "Restaurant J".

One example of the content of the storage Information table 600 will be described with reference to FIG. 6. The storage information table 600 is realized by, for example, a recording area such as the memory 302 or the disk 305 depicted in FIG. 3.

Figure 6:
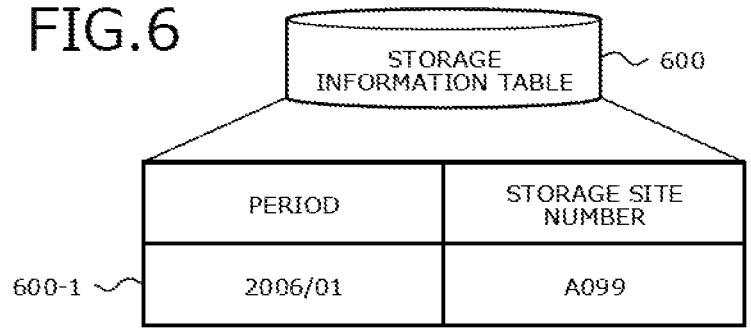
FIG. 6 is an explanatory diagram of one example of the content of a storage information table 600.

FIG. 6 is an explanatory diagram, of one example of the content of the storage information table 600. As depicted in FIG. 6, the storage information table 600 has fields for storage site numbers, associated with a field for periods. For each period for a transaction date, information is set into the associated field, whereby the storage information table 600 records storage information as a record 600-$c$. "$c$" is a natural number.

A period is the period that may be taken by the transaction date. A storage site number is information indicating the storage site 130 storing therein the transaction slip 120 whose transaction date is within the period. For example, the record 600-1 is storage information indicating that the transaction slip 120 whose transaction date is included in "2006/01" is a transaction slip 120 stored in the storage site 130 represented by the storage site number "A099".

An example of hardware configuration of the information accumulating apparatus 202 included in the transaction slip seeking system 200 depicted in FIG. 2 will be described with reference to FIG. 7.

Figure 7:
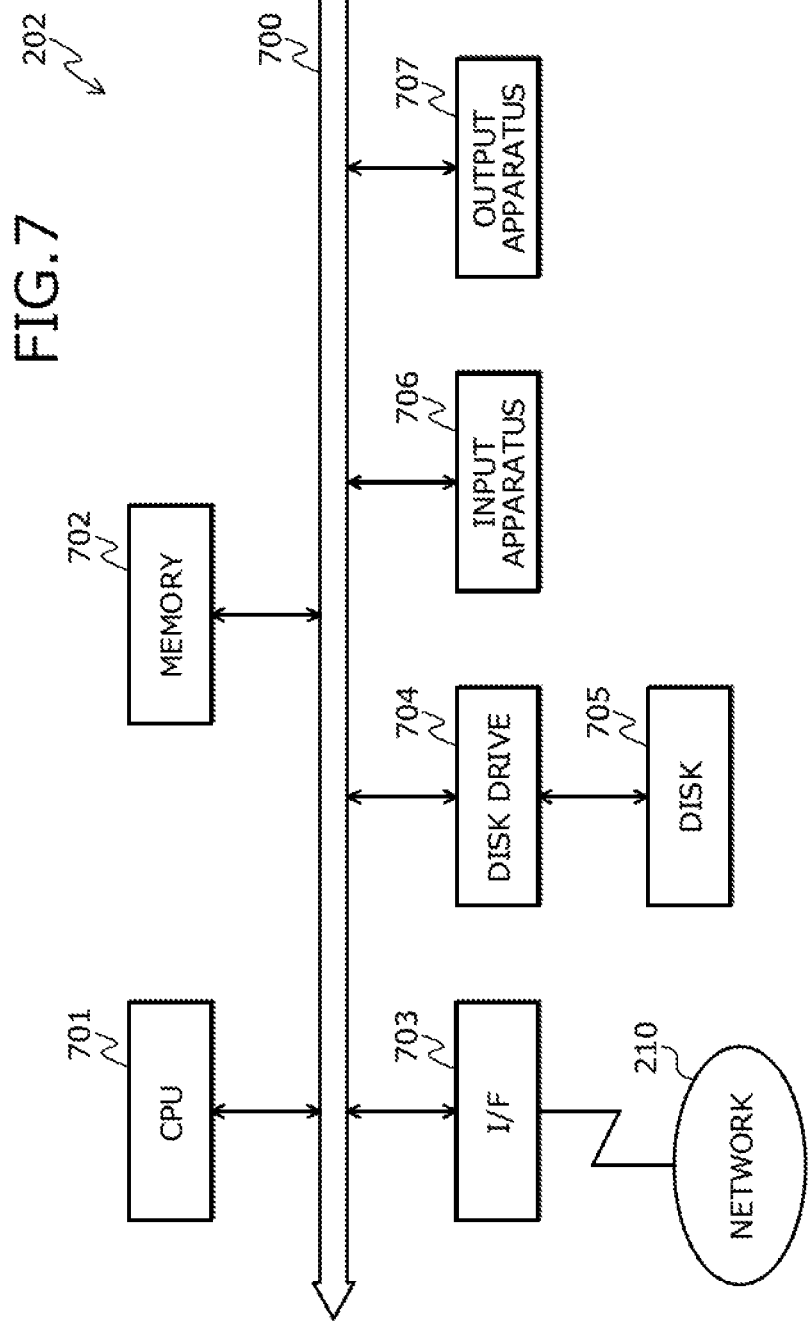
FIG. 7 is a block diagram of an example of hardware configuration of an information accumulating apparatus 202.

FIG. 7 is a block diagram of an example of hardware configuration of the information accumulating apparatus 202. In FIG. 7, the information accumulating apparatus 202 includes a CPU 701, a memory 702, an I/F 703, a disk drive 704, a disk 705, an input apparatus 706, and an output apparatus 707. These components are connected to each other by a bus 700.

The CPU 701 supervises the overall control of the information accumulating apparatus 202. The memory 702 includes, for example, ROM, RAM, and flash ROM. For example, the flash ROM and the ROM record various programs and the RAM is used as a work area of the CPU 701. The programs recorded in the memory 702 are loaded onto the CPU 701, whereby a coded process is executed by the CPU 701. The memory 702 records therein a company information table 800 that, is described later with reference to FIG. 8.

The I/F 703 is connected to the network 210 through a communication line and is connected to other computers through the network 210. The I/F 703 administers an internal interface with the network 210 and controls the input and output, of data with respect to other computers. For example, a modem or a LAN adaptor may be employed as the I/F 703.

The disk drive 704, under the control of the CPU 701, controls the reading and writing of data with respect, to the disk 705. The disk drive 704 is, for example, a magnetic disk drive. The disk 705 is non-volatile memory recording data written thereto under the control of the disk drive 704. Instead of the memory 702, the disk 705 may record the company information table 800 that is described later with reference to FIG. 8. The disk 705 is, for example, a magnetic disk or an optical disk.

The input apparatus 706 is an interface that, inputs various types of data by a user operation via a keyboard or a touch panel. The input apparatus 706 may be a pointing device such as a mouse. The output, apparatus 707 is an interface that, outputs data according to an instruction of the CPU 701. The output apparatus 707 is, for example, a display that displays data such as a document, an image, or functional information in addition to a cursor, an icon, or a toolbox. The output, apparatus 707 may be a printer.

The information accumulating apparatus 202 may include, for example, an SSD, a keyboard, a mouse, and a display in addition to the above components. The information accumulating apparatus 202 may include an SSD or the like instead of the disk drive 704 and the disk 705.

One example of the content of the company information table 800 will be described with reference to FIG. 8. The company information table 800 is realized by, for example, a recording area such as the memory 702 or the disk 705 depicted in FIG. 7.

Figure 8:
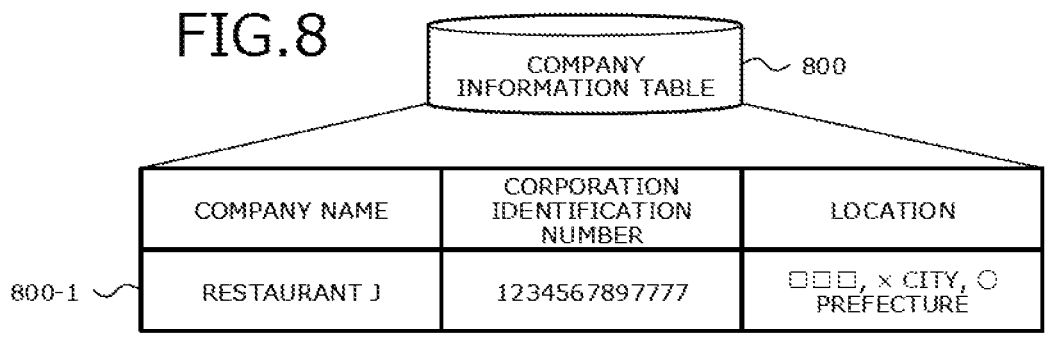
FIG. 8 is an explanatory diagram of one example of the content of a company information table 300.

FIG. 8 is an explanatory diagram of one example of the content of the company information table 800. As depicted in FIG. 8, the company information table 800 has fields for corporation identification numbers and locations, associated with a field for company names. For each company, information is set into each of the fields, whereby the company information table 800 records company information as a record 800-*d*. "d" is a natural number.

A company name is the name of a company. The name of a company is, for example, a corporation name. A corporation identification number is a corporation identification number of the company. A location is the address of the company. For example, the record 800-1 is company information indicating that the company having the company name "Restaurant J" is a company to which the corporation identification number "1234567897777" is assigned and whose address is "□□□, x City, ○ Prefecture".

Art example of hardware configuration of the client apparatus 203 included in the transaction slip seeking system 200 depicted in FIG. 2 will be described with reference to FIG. 9.

Figure 9:
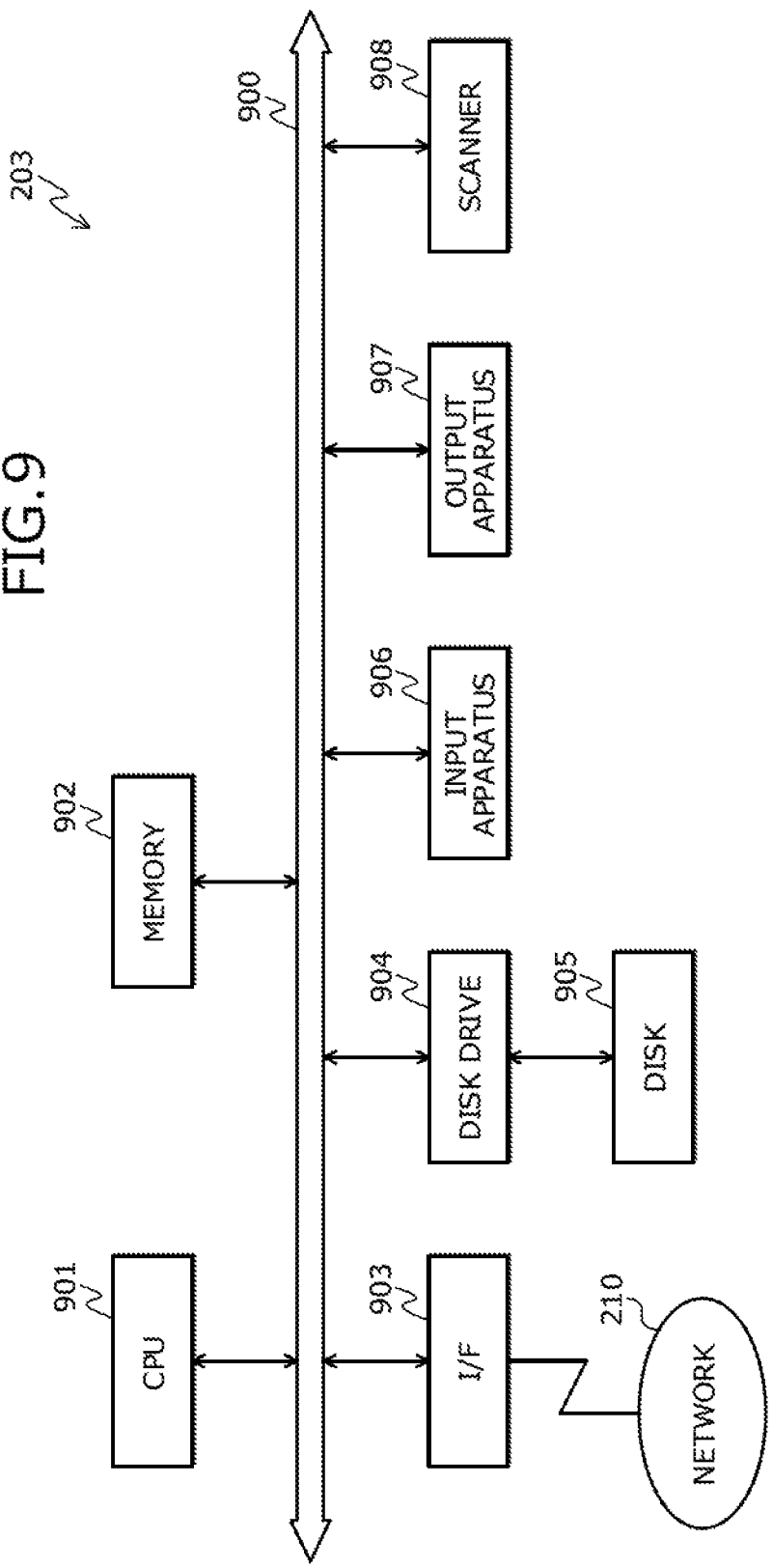
FIG. 9 is a block diagram of an example of hardware configuration of a client apparatus 203.

FIG. 9 is a block diagram of an example of hardware configuration of the client apparatus 203. In FIG. 9, the client apparatus 203 includes a CPU 901, memory 902, an I/F 903, a disk drive 904, a disk 905, an input apparatus 906, an output apparatus 907, and a scanner 908. These components are connected to each other by a bus 900.

The CPU 901 supervises the overall control of the client apparatus 203. The memory 902 includes, for example, ROM, RAM, and flash ROM. For example, the flash ROM and the ROM record various programs therein and the RAM is used as a work area of the CPU 901. The programs recorded in the memory 902 are load onto the CPU 901, whereby a coded process is executed by the CPU 901.

The I/F 903 is connected to the network 210 through a communication line and is connected to other computers through the network 210. Other computers include, for example, the information accumulating apparatus 202 and another client apparatus 203 depicted in FIG. 2. The I/F 903 administers an internal interface with the network 210 and controls the input and output of data with respect to other computers. For example, a modem, or a LAN adaptor may be employed as the I/F 903.

The disk drive 904, under the control of the CPU 901, controls the reading and writing of data with respect to the disk 905. The disk drive 904 is, for example, a magnetic disk drive or an optical disk drive. The disk 905 is non-volatile memory recording data written thereto under the control of the disk drive 904. The disk 905 is, for example, a magnetic disk or an optical disk.

The input apparatus 906 is an interface that inputs various types of data by a user operation such as via a keyboard or a touch panel. The input apparatus 906 may be a pointing device such as a mouse. The output apparatus 907 is an interface that outputs data according to an instruction of the CPU 901. The output apparatus 907 is, for example, a display that displays data such as a document, an image, or functional information in addition to a cursor, an icon, or a toolbox. The output apparatus 907 may be a printer.

The scanner 908 captures image data of objects by scanning the objects and detects the object to be searched for based on the captured image data. For example, the scanner 908 captures image data of the transaction slips 120 by scanning the transaction slips 120 and detects the transaction slip 120 searched for based on the captured image data. The scanner 908 captures image data of an object by scanning the object and prints information concerning the object. For example, the scanner 908 captures the image data of a transaction slip 120 by scanning the transaction slip 120 and prints the information identifying the transaction slip 120 on the back of the transaction slip 120.

Among the components above, configuration of the client apparatus 203 may omit, for example, the disk drive 904 and the disk 905. The client apparatus 203 may include, for example, an SSD and a semiconductor memory in addition to the above components. The client apparatus 203 may include an SSD, a semiconductor memory, and the like instead of the disk drive 904 and the disk 905.

Although a case is described above where the client apparatus 203 includes the scanner 908, configuration is not limited hereto. For example, the client apparatus 203 may be connected to an external scanner through the network 210, and may receive the result of the scanning of the transaction slip 120, the result of the detection of the transaction slip 120, and the like, from the external scanner.

A first example of the transaction slip seeking system 200 will be described with reference to FIG. 2. As the first example, a case where the managing apparatus 201 acts as the information processing apparatus 100 depicted in FIG. 1 will be described.

In this case, the managing apparatus 201 acquires the image data of the transaction slip 120 output from the scanner 908 of the client apparatus 203, via the client apparatus 203 and receives input of information concerning the details described in the transaction slip 120. The managing apparatus 201 may make an inquiry to the information accumulating apparatus 202, about the company information that corresponds to the corporation identification number and may receive the company information as the information concerning the details described in the transaction slip 120. The managing apparatus 201 updates the journal table 400 depicted in FIG. 4.

In this case, the managing apparatus 201 refers to the journal table 400 depicted in FIG. 4 and causes the information identifying the transaction slip 120 that satisfies the search conditions to be displayed, via the output apparatus 907 of the client apparatus 203. The managing apparatus 201 receives a detection notice, a completion notice, and the like output from the scanner 908 of the client apparatus 203 through the client apparatus 203, and causes the display content of the output apparatus 907 of the client apparatus 203 to be updated.

Although a case is described above where the managing apparatus 201 receives the information output from the scanner 908 of the client apparatus 203, the receipt of the information is not limited to the above. For example, the managing apparatus 201 may receive information output from an independent scanner included in the transaction slip seeking system 200 through the network 210.

A second example of the transaction slip seeking system 200 will be described. As the second example, a case where the client apparatus 203 acts as the information processing apparatus 100 depicted in FIG. 1 will be described.

In this case, the managing apparatus 201 delivers information of the various tables depicted in FIGS. 4 to 6 to the client apparatus 203. The client apparatus 203 acquires the image data of the transaction slip 120 output from the scanner 908 and receives input of information concerning the details described in the transaction slip 120. The client apparatus 203 may make an inquiry to the information accumulating apparatus 202, about the company information that corresponds to the corporation identification number and may receive the company information as the information concerning the details described in the transaction slip 120. The client apparatus 203 updates the journal table 400 depicted in FIG. 4.

In this case, the client apparatus 203 refers to the journal table 400 depicted in FIG. 4 and displays the information identifying the transaction slip 120 that satisfies the search conditions, via the output apparatus 907. The client apparatus 203 receives a detection notice, a completion notice, and the like output from the scanner 908 and causes the display content of the output apparatus 907 to be updated.

Although a case is described above where the client apparatus 203 receives the information output from the scanner 908, the receipt of the information is not limited to the above. For example, the client apparatus 203 may receive information output from an independent scanner included in the transaction slip seeking system 200, via the network 210.

A third example of the transaction slip seeking system 200 will be described. As the third example, a case where the client apparatus 203 stores the various tables depicted in FIGS. 4 to 6 therein instead of the managing apparatus 201 and acts as the information processing apparatus 100 depicted in FIG. 1 will be described.

In this case, the transaction slip seeking system 200 may omit the managing apparatus 201. The client apparatus 203 acquires the image data of the transaction slip 120 output from the scanner 908 and receives input of information concerning the details described in the transaction slip 120. The client apparatus 203 may make an inquiry to the information accumulating apparatus 202, about the company information that corresponds to the corporation identification number and may receive the company information as the information concerning the details described in the transaction slip 120. The client apparatus 203 updates the journal table 400 depicted in FIG. 4.

In this case, the client apparatus 203 refers to the journal table 400 depicted in FIG. 4 and displays, via the output apparatus 907, the information identifying the transaction slip 120 that satisfies the search conditions. The client apparatus 203 receives a detection notice, a completion notice, and the like output from the scanner 908 and causes the display content of the output apparatus 907 to be updated.

Although a case is described above where the client apparatus 203 receives the information output from the scanner 908, the receipt of the information is not limited to the above. For example, the client apparatus 203 may receive information output from an independent scanner included in the transaction slip seeking system 200 through the network 210.

In the first to the third examples, when the managing apparatus 201 or the client apparatus 203 does not make an inquiry to the information accumulating apparatus 202, about the company name that corresponds to the corporation identification number, the transaction slip seeking system 200 may omit the information accumulating apparatus 202. A case where the managing apparatus 201 acts as the information processing apparatus 100 depicted in FIG. 1, as in the first example, will be described later.

An example of a functional configuration of the information processing apparatus 100 will be described with reference to FIG. 10. A case where the client apparatus 203 acts as the information processing apparatus 100 will be described.

Figure 10:
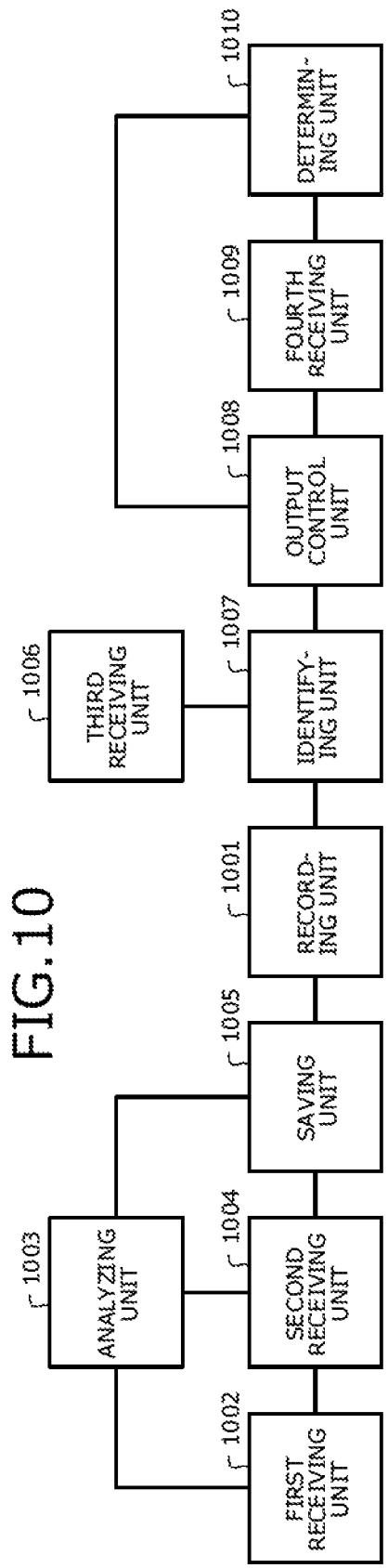
FIG. 10 is a block diagram of an example of a functional configuration of an information processing apparatus 100.

FIG. 10 is a block diagram of an example of a functional configuration of the information processing apparatus 100. The information processing apparatus 100 includes a recording unit 1001, a first receiving unit 1002, an analyzing unit 1003, a second receiving unit 1004, a saving unit 1005, a third receiving unit 1006, an identifying unit 1007, an output control unit 1008, a fourth receiving unit 1009, and a determining unit 1010.

The recording unit 1001 is realized by, for example, a recording area such as the memory 902 or the disk 905 depicted in FIG. 9. The components from the first receiving unit 1002 to the determining unit 1010 are functions to be a control unit and are realized by, for example, causing the CPU 901 to execute programs recorded in a recording device such as the memory 902 or the disk 905 depicted in FIG. 9, or by the I/F 903. Results of the processing by each of the functional units are recorded to, for example, a recording area such as the memory 902 or the disk 905.

The recording unit 1001 records associated therein the name of each transaction counterpart and the logo of the transaction counterpart. For example, the recording unit 1001 records associated therein the name of each transaction counterpart and the address of the recording area of the image data of the logo of the transaction counterpart. For example, the recording unit 1001 records therein the logo information table 500. The recording unit 1001 enables the name of the transaction counterpart to be identified based on the logo when the logo is included in the transaction slip 120.

The recording unit 1001 records associated therein the period and the storage site 130 of the transaction slip 120 having described therein the transaction date within the period. The transaction slip 120 may be a combination of a document having the transaction amount described therein and a document having the transaction details described therein. On the back of the transaction slip 120, information representing a transaction slip 120 is printed. The storage site 130 of the transaction slip 120 is, for example, a corrugated cardboard box or a file cabinet storing the transaction slip 120 therein in a warehouse. The recording unit 1001 records therein the storage information table 600, for example. Thus, the recording unit 1001 enables identification of a storage site 130 to which a transaction slip 120 should be stored based on the transaction date described in the transaction slip 120.

The recording unit 1001 records associated therein the information of the transaction slip 120 and the information indicating the storage site 130 of the transaction slip 120. The information of the transaction slip 120 includes, for example, the information identifying the transaction slip 120 and the information concerning the details described in the transaction slip 120. The information identifying the transaction slip 120 is, for example a character string representing the transaction slip 120. The information identifying the transaction slip 120 is, for example, the administrative number representing the transaction slip 120. When reading by a human is not considered, the information identifying the transaction slip 120 may be a bar code easily read by a computer. The information indicating the storage site 130 is, for example, a storage site number representing the storage site 130. The recording unit 1001 records therein, for example, the journal table 400. The recording unit 1001 thereby enables identification of the storage site 130 storing the transaction slip 120.

The first receiving unit 1002 receives the image data of the transaction slip 120 output from the scanner and the information identifying the transaction slip 120. The scanner captures the image data of the transaction slip 120 by scanning the transaction slip 120 and prints the information identifying the transaction slip 120 on the back of the transaction slip 120. The scanner is, for example, the scanner 908 of the client apparatus 203. The scanner may be the scanner 308 of the managing apparatus 201.

Although the case is described above where the scanner outputs the information identifying the transaction slip 120, the output of the information is not limited hereto. For example, instead of the information identifying the transaction slip 120, the scanner may output image data of the point where the information identifying the transaction slip 120 is printed. In this case, the first receiving unit 1002 receives the image data of the transaction slip 120 output from the scanner and the image data of the point where the information identifying the transaction slip 120 is printed. For example, the first receiving unit 1002 receives image data of the front of the transaction slip 120 output from the scanner and the image data of the back of the transaction slip 120, where the information identifying the transaction slip 120 is printed.

For example, the user of the client apparatus 203 sets the transaction slip 120 in the scanner 908 of the client apparatus 203 and causes the scanner 908 to scan the transaction slip 120. The client apparatus 203 transfers to the information processing apparatus 100, the image data of the transaction slip 120 output from the scanner 908 and the information identifying the transaction slip 120. The first receiving unit 1002 receives the image data of the transaction slip 120 and the information identifying the transaction slip 120, output from the scanner 908 of the client apparatus 203 and transferred thereto via the client apparatus 203. The first receiving unit 1002 thereby receives the information to be recorded to the recording unit 1001.

The analyzing unit 1003 analyzes the image data received by the first receiving unit 1002 and acquires the information concerning the details described in the transaction slip 120. The information concerning the details described in the transaction slip 120 is, for example, the name of the transaction counterpart, the transaction date, the transaction amount, and the like. The analyzing unit 1003 executes character recognition for the image data to identify the name of the transaction counterpart, the transaction date, the transaction amount, and the like described in the transaction slip 120. When the scanner outputs the image data of the point where the information identifying the transaction slip 120 is printed, instead of the information identifying the transaction slip 120, the analyzing unit 1003 analyzes the image data of the point where the information identifying the transaction slip 120 is printed (the image data being received by the first receiving unit 1002) and thereby acquires the information identifying the transaction slip 120. The analyzing unit 1003 acquires, for example, the administrative number printed on the back of the transaction slip 120. The analyzing unit 1003 can thereby identify the information to be recorded to the recording unit 1001.

For example, the analyzing unit 1003 extracts the corporation identification number of the transaction counterpart from the image data received by the first receiving unit 1002, makes an inquiry to the information accumulating apparatus 202, about the name of the corporation that corresponds to the extracted corporation identification number, and receives the name of the corporation from the information accumulating apparatus 202. The analyzing unit 1003 identifies the received name of the corporation as the name of the transaction counterpart. The analyzing unit 1003 can thereby identify the name of the transaction counterpart even when the name of the transaction counterpart cannot be acquired by character recognition.

The analyzing unit 1003 extracts the logo of the transaction counterpart from the image data received by the first receiving unit 1002 and refers to the recording unit 1001 to identify the name of the transaction counterpart that corresponds to the extracted logo. The analyzing unit 1003 refers to the logo information table 500 to identify the company name that corresponds to the image data of the logo, as the name of the transaction counterpart. The analyzing unit 1003 can thereby identify the name of the transaction counterpart even when the name of the transaction counterpart cannot be acquired using character recognition.

The analyzing unit 1003 extracts the transaction date described in the transaction slip 120, which is the source of the image data, from the image data received by the first receiving unit 1002 and refers to the recording unit 1001 to identify the storage site 130 that corresponds to the extracted transaction date. For example, the analyzing unit 1003 refers to the storage information table 600 to identify the storage site 130 that stores transaction slips 120 of the extracted transaction date. The analyzing unit 1003 can thereby identify the storage site 130 for a transaction slip 120 not yet stored.

The second receiving unit 1004 outputs the image data received by the first receiving unit 1002 and receives an input of information concerning the details described in the transaction slip 120 for which the image data is output. The second receiving unit 1004 causes the output apparatus 907 of the client apparatus 203 to display the received image data and receives the input of the information concerning the details described in the transaction slip 120 via the client apparatus 203. The second receiving unit 1004 can thereby acquire the information to be recorded to the recording unit 1001.

The second receiving unit 1004 may output the image data received by the first receiving unit 1002, may output the information concerning the details described in the transaction slip 120 identified by the analyzing unit 1003, and may receive the input of the information concerning the details described in the transaction slip 120 for which the image data is output. The second receiving unit 1004 can thereby receive input of the information concerning the details described in the transaction slip 120 when information concerning the details described in the transaction slip 120 is present in addition to the information identifiable by the analyzing unit 1003.

To output the details described in the transaction slip 120 identified by the analyzing unit 1003, the second receiving unit 1004 can receive correction of the information concerning the details described in the transaction slip 120 identified by the analyzing unit 1003. The second receiving unit 1004 can reduce the amount of work necessary for inputting the information concerning the details described in the transaction slip 120 identified by the analyzing unit 1003 because the information concerning the details described in the transaction slip 120 identified by the analyzing unit 1003 does not need to be input again.

When the logo extracted by the analyzing unit 1003 is not recorded in the recording unit 1001, the second receiving unit 1004 receives input of the name of the transaction counterpart that corresponds to the extracted logo. The second receiving unit 1004 can thereby acquire the information to be recorded to the recording unit 1001. The second receiving unit 1004 receives input of the company name that is the issuing source or the like when the corporation identification number is not described in the transaction slip 120.

The saving unit 1005 generates information of the transaction slip 120 including at least the information identifying the transaction slip 120 received by the first receiving unit 1002 and the information concerning the details described in the transaction slip 120 for which the second receiving unit 1004 receives the input thereof. The saving unit 1005 associates and records to the recording unit 1001, the generated information concerning the transaction slip 120 and the information indicating the storage site 130 of the transaction slip 120. For example, the saving unit 1005 generates information of the transaction slip 120 including the received information identifying the transaction slip 120 and the information concerning the details described in the transaction slip 120 and whose input is received via the client apparatus 203, and updates the journal table 400. The saving unit 1005 can thereby update the journal table 400 using the accounting book information concerning the transaction slip 120 scanned by the scanner 908 of the client apparatus 203.

The saving unit 1005 generates information of the transaction slip 120 including at least the information identifying the transaction slip 120 received by the first receiving unit 1002 and the information concerning the details described in the transaction slip 120 acquired in the analysis executed by the analyzing unit 1003 of the image data received by the first receiving unit 1002. The saving unit 1005 associates and records to the recording unit 1001, the generated information of the transaction slip 120 and the information indicating the storage site 130 of the transaction slip 120. For example, the saving unit 1005 associates and records to the recording unit 1001, the information identifying the transaction slip 120 received by the first receiving unit 1002, the information of the transaction slip 120 received by the analyzing unit 1003 and including the name of the transaction counterpart, and the information indicating the storage site 130 of the transaction slip 120.

For example, the saving unit 1005 associates and records to the recording unit 1001, the information of the transaction slip 120 that includes the information identifying the transaction slip 120 received by the first receiving unit 1002 and the information indicating the storage site 130 identified by the analyzing unit 1003. The saving unit 1005 can thereby update the journal table 400 using the accounting book information concerning the transaction slip 120 scanned by the scanner 908 of the client apparatus 203.

The saving unit 1005 associates and records to the recording unit 1001, the image data of the logo extracted by the analyzing unit 1003 and the name of the transaction counterpart whose input is received by the second receiving unit 1004. The saving unit 1005 can thereby generate logo information concerning the image data of a logo not recorded in the logo information table 500 and update the logo information table 500.

The third receiving unit 1006 receives the search conditions for the transaction slip 120. For example, the third receiving unit 1006 receives the period that may be taken by the transaction date of the transaction slip 120, the range of amount that may be taken by the transaction amount of the transaction slip 120, the type of the transaction slip 120, and the like as the conditions to be satisfied by the transaction slip 120 sought. The third receiving unit 1006 can thereby identify the conditions to be satisfied by the transaction slip 120 sought.

The identifying unit 1007 refers to the recording unit 1001 and identifies for each of the storage sites 130 of the transaction slips 120, the transaction slips 120 satisfying the search conditions received by the third receiving unit 1006. The identifying unit 1007 refers to the journal table 400 and identifies the accounting book information that includes the transaction date, the transaction amount, and the like satisfying the search conditions received by the third receiving unit 1006. The identifying unit 1007 can thereby identify the accounting book information that indicates a transaction slip 120 satisfying the search conditions and the storage site 130 of the transaction slip 120.

The output control unit 1008 associates and outputs information identifying the transaction slip 120 identified by the identifying unit 1007 and information indicating the storage site 130 of each of the identified transaction slips 120. For example, the output control unit 1008 associates and outputs information identifying among the transaction slips 120 identified by the identifying unit 1007, the transaction slips 120 stored in the identified storage sites 130 and information indicating the corresponding storage site 130. For example, the output control unit 1008 causes the output apparatus 907 of the client apparatus 203 to display for each piece of information indicating the storage site 130 included in the identified accounting book information, the information identifying the transaction slip 120 included in the identified accounting book information and stored in the storage site 130. The output control unit 1008 can thereby notify the user of the client apparatus 203, of the storage site 130 that stores the transaction slip 120 satisfying the search conditions.

The fourth receiving unit 1009 receives a detection notice output in response to the detection of the transaction slip 120 searched for and stored in a storage site 130. The scanner scans the transaction slips 120 to detect the transaction slip 120 searched for. For example, the scanner scans the transaction slip 120, recognizes the information identifying the transaction slip 120 that is printed on the back of the transaction slip 120, and detects the transaction slip 120 searched for. The scanner may detect the transaction slip 120 searched for based on the information concerning the details described in the transaction slip 120 described on the front of the transaction slip 120. The scanner is, for example, the scanner 908 of the client apparatus 203. The scanner may be the scanner 308 of the managing apparatus 201. The scanner may be an independent scanner included in the transaction slip seeking system 200. The detection notice includes, for example, the information identifying the detected transaction slip 120. For example, the fourth receiving unit 1009 receives from the scanner, the detection notice output in response to the detection of the transaction slip 120 identified by the identifying unit 1007 and stored in the storage site 130.

For example, the user of the client apparatus 203 sets the transaction slips 120 in the scanner 908 of the client apparatus 203 and causes the scanner 908 to scan the transaction slips 120. The client apparatus 203 transfers to the information processing apparatus 100, the detection notice output from the scanner 908. The fourth receiving unit 1009 receives the detection notice output from the scanner 908 of the client apparatus 203 and transferred through the client apparatus 203. The fourth receiving unit 1009 can thereby identify the detected transaction slip 120 among the identified transaction slips 120.

The fourth receiving unit 1009 receives from the scanner, a completion notice output corresponding to the completion of the scanning of the plural transaction slips 120 stored in the storage site 130. The fourth receiving unit 1009 receives from the scanner, the completion notice output in response to the completion of the scanning of the plural transaction slips 120 that are identified by the identifying unit 1007 and that are stored in the storage site 130.

For example, the user of the client apparatus 203 sets the transaction slips 120 in the scanner 908 of the client apparatus 203 and causes the scanner 908 to scan the transaction slips 120. The client apparatus 203 transfers to the information processing apparatus 100, the detection notice output from the scanner 908. The fourth receiving unit 1009 receives the detection notice output from the scanner 908 of the client apparatus 203 and transferred via the client apparatus 203. The fourth receiving unit 1009 can thereby detect the completion of the scanning of the identified plural transaction slips 120 that are stored in the identified storage site 130.

The determining unit 1010 determines based on the detection notices received by the fourth receiving unit 1009, whether all the transaction slips 120 searched for and recorded associated with an identified storage site 130 have been detected. For example, the determining unit 1010 determines based on the detection notices received by the fourth receiving unit 1009, whether all the transaction slips 120 identified for each storage site 130 have been detected.

For example, the determining unit 1010 determines whether all the identified transaction slips 120 have been detected by determining whether the number of detected transaction slips 120 is the number of identified transaction slips 120 that are stored in the identified storage site 130. For example, based on the received detection notices, the determining unit 1010 compares the number of detected transaction slips 120 and the number of identified transaction slips 120 that are stored in the identified storage site 130 and when the numbers match, determines that all the identified transaction slips 120 have been detected.

For example, based on the received detection notices, the determining unit 1010 may determine whether all the identified transaction slips 120 have been detected, by comparing the information identifying the detected transaction slips 120 with the information identifying the identified transaction slips 120 that are stored in the identified storage site 130. For example, the determining unit 1010 generates a list of information identifying the identified transaction slips 120 stored in the identified storage site 130; deletes from the list, the information identifying the detected transaction slips 120; and when all the information has been deleted, determines that all the identified transaction slips 120 have been detected. The determining unit 1010 can thereby determine whether all the identified transaction slips 120 have been detected.

When the determining unit 1010 receives the completion notice, the determining unit 1010 determines based on the received detection notices, the state of the detection of the transaction slips 120 searched for and recorded associated with a specific storage site 130 and generates information indicating the detection state. For example, when the determining unit 1010 receives the completion notice, the determining unit 1010 generates based on the received detection notices, information corresponding to the result of the comparison between the number of detected transaction slips 120 and the number of identified transaction slips 120 stored in the identified storage site 130. For example, the determining unit 1010 generates information indicating the number of undetected transaction slips 120.

For example, when the determining unit 1010 receives the completion notice, the determining unit 1010 may determine based on the received detection notices, whether an undetected transaction slip 120 is present among the identified transaction slips 120 and may generate information indicating whether an undetected transaction slip 120 is present. For example, the determining unit 1010 generates information that includes information identifying the undetected transaction slips 120 and that indicates that the undetected transaction slips 120 are present. The determining unit 1010 can thereby determine whether undetected transaction slips 120 among the identified transaction slips 120 are present.

The output control unit 1008 outputs to the scanner, an instruction to discontinue the scanning in response to a determination by the determining unit 1010 that all the transaction slips 120 identified for each storage site 130 have been detected. For example, the output control unit 1008 outputs to the scanner 908 via the client apparatus 203, an instruction to discontinue the scanning, in response to the determination by the determining unit 1010 that all the identified transaction slips 120 stored in the identified storage site 130 have been detected. For example, the output control unit 1008 may output to the scanner, the instruction to discontinue the scanning in response to a determination by the determining unit 1010 that the number of detected transaction slips 120 is the number of the identified transaction slips 120 that are stored in the identified storage sites 130. The output control unit 1008 can thereby discontinue the scanning of the transaction slips 120 by the scanner 908 of the client apparatus 203 when all the identified transaction slips 120 have been detected.

The output control unit 1008 outputs information that corresponds to the generated comparison result. For example, the output control unit 1008 causes the output apparatus 907 of the client apparatus 203 to display information that corresponds to the comparison result. The output control unit 1008 can thereby notify the user of the client apparatus 203 of the information indicating whether an undetected transaction slip 120 among the identified transaction slips 120 is present.

When the output control unit 1008 receives the detection notice, the output control unit 1008 associates and outputs information indicating that a transaction slip 120 has been detected and information identifying the detected transaction slip 120. For example, the output control unit 1008 causes the output apparatus 907 of the client apparatus 203 to associate and display the information indicating that the transaction slip 120 has been detected and the information identifying the detected transaction slip 120. The output control unit 1008 can thereby notify the user of the client apparatus 203 of the information identifying the detected transaction slip 120 among the identified transaction slips 120.

Although a case is described above where the information processing apparatus 100 includes the components of the first receiving unit 1002 to the determining unit 1010 as functions to be a control unit, configuration is not limited hereto. For example, configuration of the information processing apparatus 100 may omit the components of the first receiving unit 1002 to the saving unit 1005. Configuration of the information processing apparatus 100 may omit the components of the third receiving unit 1006 to the determining unit 1010.

Figure 11:
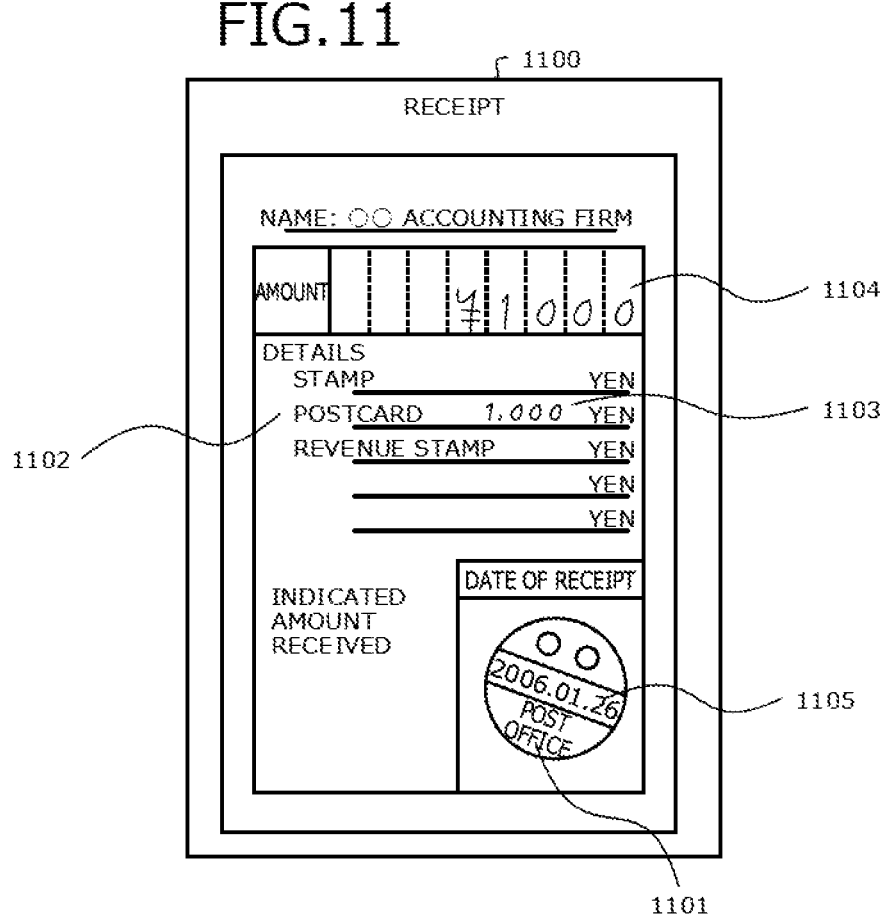
FIG. 11 is an explanatory diagram of an example of details described in a transaction slip 1100.
Figure 13:
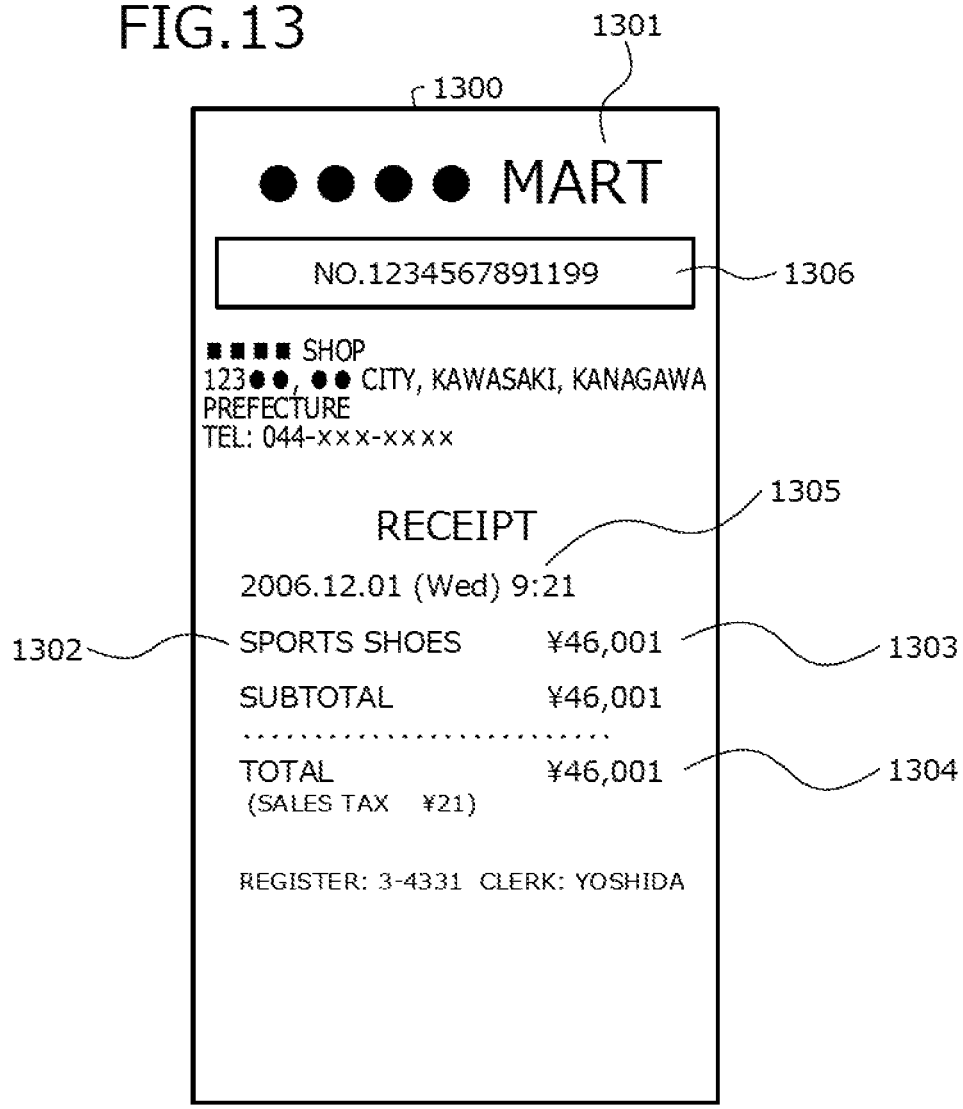
FIG. 13 is an explanatory diagram of an example of details described in a transaction slip 1300.

An example will be described for a case where the managing apparatus 201 acts as the information processing apparatus 100 depicted in FIG. 1. In the example, a company manages various types of transaction slips 120 such as receipts, billing statements, copies of the receipts, copies of the billing statements, and combined-receipt and billing statements. FIGS. 11 to 13 respectively depict transaction slips 1100, 1200, and 1300 as examples of the transaction slips 120 managed by the company.

An example of the details described in the transaction slip 1100 managed by the company will be described with reference to FIG. 11. In the example depicted in FIG. 11, the transaction slip 1100 is a receipt managed by a certain company.

FIG. 11 is an explanatory diagram of an example of the details described in the transaction slip 1100. As depicted in FIG. 11, the transaction slip 1100 includes a name 1101 of a company that is the transaction counterpart and that issued the transaction slip 1100. The transaction slip 1100 includes, for example, the name "post office" as the name of the company that is the transaction counterpart.

The transaction slip 1100 includes for each piece of merchandise, a merchandise name 1102 and a price 1103 inclusive of tax. The transaction slip 1100 includes, for example, the merchandise name "postcard" and the price "1,000 yen" inclusive of tax. The transaction slip 1100 includes a total amount 1104. The transaction slip 1100 includes, for example, the total amount "1,000 yen". The transaction slip 1100 includes a transaction date 1105. The transaction slip 1100 includes, for example, the transaction date "2006 Jan. 26 (Jan. 26, 2006)".

An example of the details described in the transaction slip 1200 will be described with reference to FIG. 12. In the example depicted in FIG. 12, the transaction slip 1200 is a combination of a receipt and a statement of delivery that, are managed by a certain company.

FIG. 12 is an explanatory diagram of an example of the details described in the transaction slip 1200. As depicted in FIG. 12, the transaction slip 1200 includes a name 1201 of a company that is the transaction counterpart and that issued the transaction slip 1200. The transaction slip 1200 includes, for example, the name "ΔΔ Store, Ltd." of the company that is the transaction counterpart. The transaction slip 1200 includes a transaction amount 1202. The transaction slip 1200 includes, for example, the transaction amount "53,660 yen".

The transaction slip 1200 includes a merchandise name 1203, a merchandise count 1204, a unit, price 1205 of the merchandise, and an amount 1206 of the merchandise including the tax. The transaction slip 1200 includes, for example, the merchandise name "Kusataki", the merchandise count. "50", the unit price "1,050 yen", and the amount "52,500 yen" of the merchandise including the tax. The transaction slip 1200 includes a total amount 1207. The transaction slip 1200 includes, for example, the total amount "53,660 yen". The transaction slip 1200 includes a transaction date 1208. The transaction slip 1200 includes, for example, the transaction date "2006 Mar. 26".

As described, the information processing apparatus 100 can enable understanding of the transaction details by combining and handling the receipt and the statement of delivery as the transaction slip 120. When the National Tax Agency conducts a tax audit, or the like, the company managing the transaction slip 120 can take measures for the tax audit by referring to the detailed transaction details. The company managing the transaction slip 120 can cope with the tax audit by referring to, for example, the journal accounts (the debit accounts and the credit accounts) such as entertainment expense and the like described in the journal, and the transaction details of actual purchases.

An example of the details described in the transaction slip 1300 will be described with reference to FIG. 13. In the example depicted in FIG. 13, the transaction slip 1300 is a receipt, managed by a company and is a receipt, having the logo and a corporation identification number of the company issuing the transaction slip 1300.

FIG. 13 is an explanatory diagram of an example of the details described in the transaction slip 1300. As depicted in FIG. 13, the transaction slip 1300 includes a logo 1301 of the company that issued the transaction slip 1300. The transaction slip 1300 includes, for example, the logo "●●●● MART" of the company. The transaction slip 1300 includes a merchandise name 1302 and a price 1303 inclusive of tax. The transaction slip 1300 includes, for example, the merchandise name "sports shoes" and the price "46,001 yen" inclusive of tax.

The transaction slip 1300 includes a total amount 1304. The transaction slip 1300 includes, for example, the total amount "46,001". The transaction slip 1300 includes a transaction date 1305. The transaction slip 1300 includes, for example, the transaction date "2006 Dec. 1 (Wed.) 9:21". The transaction slip 1300 includes a corporation identification number 1306. The transaction slip 1300 includes, for example, the corporation identification number "1234567891199".

A flow of the searching work for a transaction slip 120 will be described with reference to FIG. 14.

Figure 14:
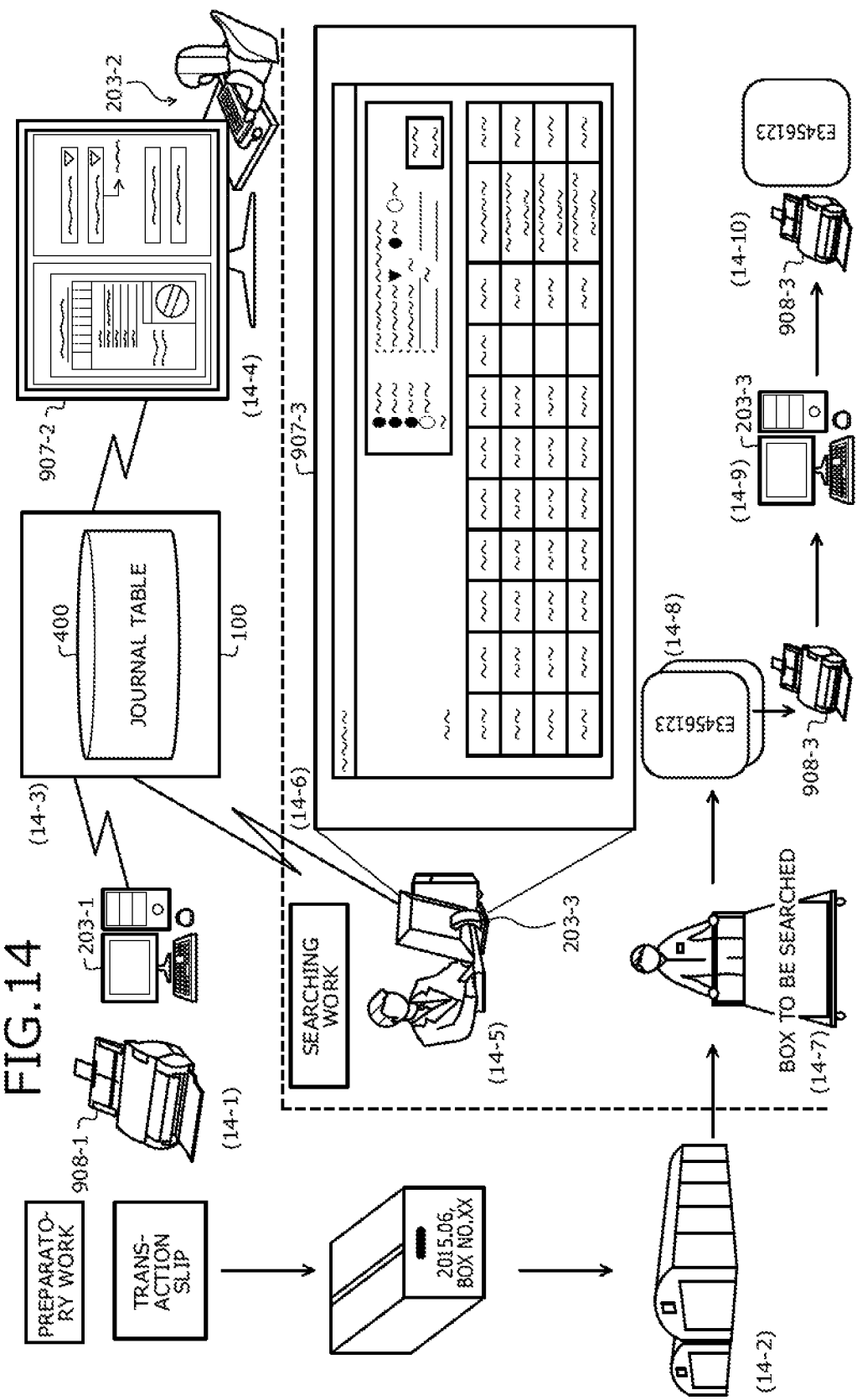
FIG. 14 is an explanatory diagram of the flow of searching work for a transaction slip 120.

FIG. 14 is an explanatory diagram of the flow of the searching work for the transaction slip 120. In FIG. 14, the transaction slip seeking system 200 includes the information processing apparatus 100 realized by the managing apparatus 201, and the plural client apparatuses 203. In the transaction slip seeking system 200, preparatory work steps (14-1) to (14-4) and searching work steps (14-5) to (14-10) are executed. In the description, the output apparatus 907 and the scanner 908 of the client apparatus 203-*i* may be described as "output apparatus 907-*i*" and "scanner 908-*i*".

(14-1) Before storing a transaction slip to a storage site 130, the user of the client apparatus 203-1 sets the transaction slip 120 in the scanner 908-1. The scanner 908-1 scans the transaction slip 120 to capture image data of the transaction slip 120, prints information identifying the transaction slip 120 on the transaction slip 120 or on the back of the mounting sheet to which the transaction slip 120 is pasted, and outputs the image data of the transaction slip 120 and the information identifying the transaction slip 120. The client apparatus 203-1 transmits to the information processing apparatus 100, accounting book information that associates the image data of the transaction slip 120 output from the scanner 908-1 with the information identifying the transaction slip 120. The information processing apparatus 100 updates the journal table 400 based on the received accounting book information.

(14-2) The user of the client apparatus 203-1 puts the scanned transaction slip 120 in the storage site 130. For example, the user of the client apparatus 203-1 collectively puts scanned transaction slips 120 for June 2015 in a corrugated cardboard box, and places the transaction slips 120 in a warehouse.

(14-3) The information processing apparatus 100 analyzes the image data of the transaction slip 120 included in the accounting book information recorded in the journal table 400 to acquire information concerning the details described in the transaction slip 120. The information processing apparatus 100 updates the accounting book information recorded in the journal table 400 using the information concerning the details described in the transaction slip 120 acquired by the analysis.

(14-4) The information processing apparatus 100 causes the output apparatus 907-2 of the client apparatus 203-2 to display the image data of the transaction slip 120 stored in the journal table 400. The client apparatus 203-2 displays the image data of the transaction slip 120 on the output apparatus 907-2 under the control of the information processing apparatus 100, receives input of the information concerning the details described in the transaction slip 120, and transmits this information to the information processing apparatus 100. The information processing apparatus 100 receives the information concerning the details described in the transaction slip 120 from the client apparatus 203-2. The information processing apparatus 100 updates the accounting book information recorded in the journal table 400 using the received information concerning the details described in the transaction slip 120.

With the preparatory work, steps (14-1) to (14-4) described above, the transaction slip 120 is stored in the storage site 130 and the accounting book information concerning the transaction slip 120 is recorded in the journal table 400 to enable the transaction slip 120 to be searched for. The searching work steps (14-5) to (14-10) will be described.

(14-5) The information processing apparatus 100 transmits the accounting book information recorded in the journal table 400 to the client, apparatus 203-3 for display thereby. The client apparatus 203-3 displays the received accounting book information, receives input of search conditions for a transaction slip 120, and transmits the search conditions to the information processing apparatus 100.

(14-6) The information processing apparatus 100 identifies transaction slips 120 satisfying the search conditions and the storage site 130 of each identified transaction slip 120, based on the journal table 400. The information processing apparatus 100 causes the output apparatus 907-3 of the client apparatus 203-3 to associate and display on the client, apparatus 203-3, information identifying among the identified transaction slips 120, the transaction slips 120 stored in the respective identified storage sites 130 and information indicating the corresponding storage site 130.

(14-7) The user of the client apparatus 203-3 refers to the displayed information indicating the storage site 130 and retrieves from the storage site 130, transaction slips 120 including the transaction slips 120 that, satisfy the search conditions.

(14-8) The user of the client apparatus 203-3 sets in the scanner 908-3, the transaction slips 120 transported from the storage site 130. The scanner 908-3 scans the transaction slips 120; recognizes the administrative number printed on the back of each of the transaction slips 120; detects based on the recognized administrative numbers, the transaction slips 120 that satisfy the search conditions; and outputs detection notices. The scanner 908-3 outputs a completion notice corresponding to the completion of the scanning of the plural transaction slips 120 stored in the storage site 130.

Each time the scanner 908-3 outputs a detection notice, the client apparatus 203-3 transmits the output detection notice to the information processing apparatus 100. Each time the scanner 908-3 outputs a completion notice, the client apparatus 203-3 transmits the output completion notice to the information processing apparatus 100.

(14-9) The information processing apparatus 100 determines based on the received detection notices and the received completion notice, whether the number of detected transaction slips 120 is the number of identified transaction slips 120 stored in the identified storage site 130. The information processing apparatus 100 outputs to the scanner 908-3, via the client apparatus 203-3, an instruction to discontinue the scanning in response to a determination that the number of detected transaction slips 120 is the number of identified transaction slips 120 stored in the identified storage site 130.

When the information processing apparatus 100 receives the completion notice, the information processing apparatus 100 generates based on the received detection notices, information that corresponds to the result of the comparison of the number of detected transaction slips 120 and the number of transaction slips 120 searched for and recorded associated with a specific storage site 130. The information processing apparatus 100 causes the output-apparatus 907-3 of the client apparatus 203-3 to display the generated information.

The information processing apparatus 100 causes the output apparatus 907-3 of the client apparatus 203-3 to associate display information indicating that the transaction slips 120 have been detected and information identifying the detected transaction slips 120. The client apparatus 203-3 updates the display under the control of the information processing apparatus 100.

(14-10) Each time the scanner 908-3 outputs a detection notice, the user of the client apparatus 203-3 collects the transaction slip 120 for which the detection notice is output and thereby acquires a sought transaction slip 120. The user of the client apparatus 203-3 can thereby acquire sought transaction slips 120 that satisfy the search conditions.

As depicted in FIG. 14, the client apparatus 203 used in the preparatory work steps at (14-1) to (14-4) and the client apparatus 203 used in the searching work steps at (14-5) to (14-10) may be apparatuses independent of each other. The client apparatus 203 used in the preparatory work steps at (14-1) to (14-4) and the client apparatus 203 used in the searching work steps at (14-5) to (14-10) may be the same apparatus.

One example of operation of the scanner 908-1 at (14-1) in FIG. 14 will be described with reference to FIG. 15.

Figure 15:
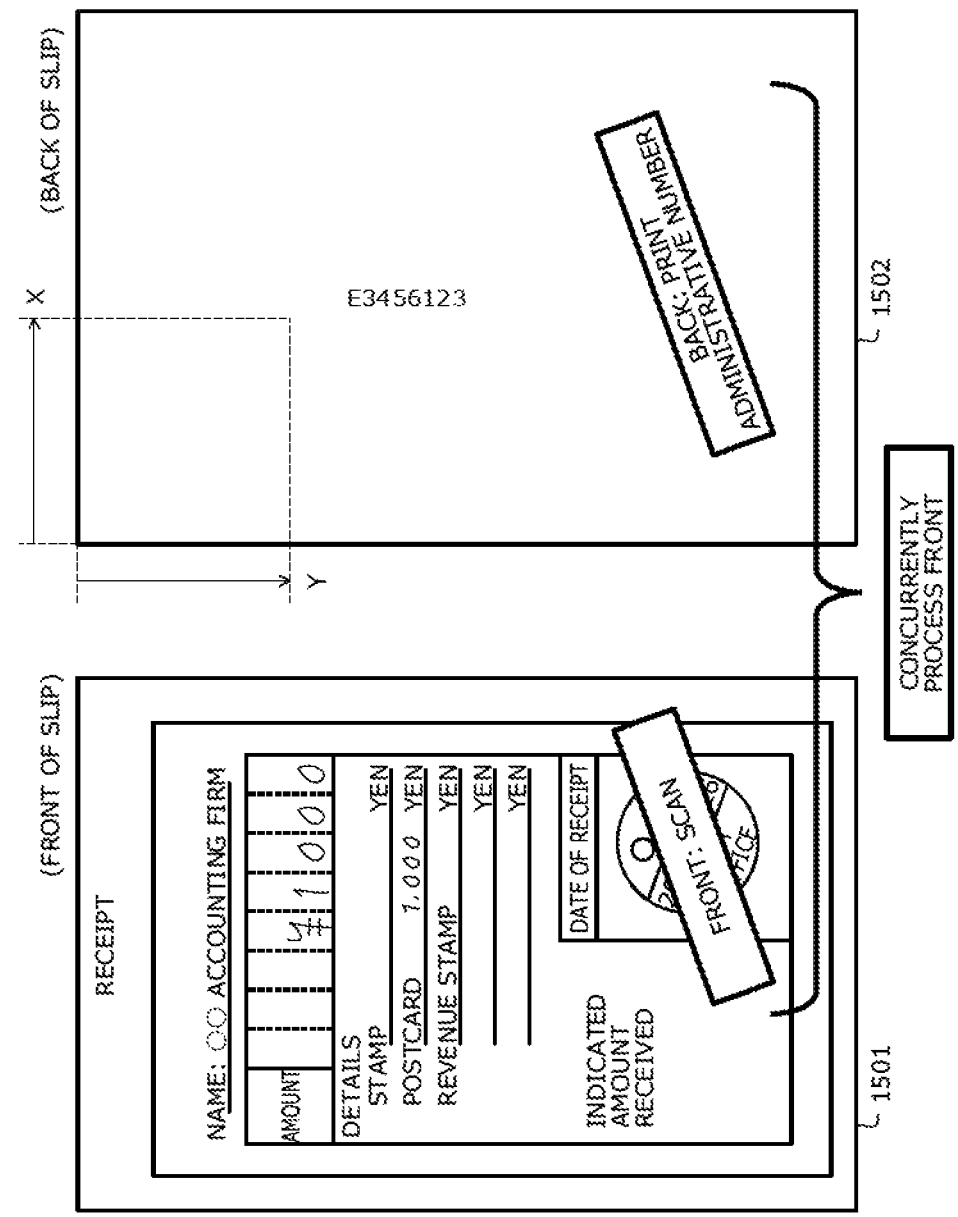
FIG. 15 is an explanatory diagram of one example of operation of a scanner 908-1.

FIG. 15 is an explanatory diagram of one example of operation of the scanner 908-1. As depicted in FIG. 15, the scanner 908-1 optically reads a front 1501 of a set transaction slip 120 to capture the image data of the transaction slip 120 and prints an administrative number differing for each transaction slip 120 on a back face 1502 of the transaction slip 120. The function of printing an arbitrary character string simultaneously with the scanning is called, for example, "in-printer function". Each time the scanner 908-1 prints the administrative number, the scanner 908-1 increments the administrative number. The scanner 908-1 outputs the captured image data of the transaction slip 120 and the administrative number printed on the back 1502 of the transaction slip 120 to the client-apparatus 203-1. The client apparatus 203-1 transfers the image data of the transaction slip 120 and the administrative number printed on the back 1502 of the transaction slip 120 to the information processing apparatus 100.

For example, the scanner 908-1 captures the image data on the front 1501 of the transaction slip 120 and prints the administrative number "E3456123" in a lateral direction from a position at coordinates (X,Y) relative to an origin, e.g., an upper left point on the back 1502 of the transaction slip 120. The scanner 908-1 increments the administrative number and updates the administrative number to be "E3456124". The scanner 908-1 transmits the captured image data of the front 1501 of the transaction slip 120 and the administrative number "E3456123" to the client-apparatus 203-1. The client apparatus 203-1 transfers the image data of the transaction slip 120 and the administrative number "E3456123" to the information processing apparatus 100.

The information processing apparatus 100 receives the image data of the transaction slip 120 and the administrative number from the client apparatus 203-1. The information processing apparatus 100 executes character recognition for the image data of the transaction slip 120 and when the information concerning the details described in the transaction slip 120 can be acquired, acquires the information concerning the details described in the transaction slip 120. The information processing apparatus 100 generates and adds as accounting book information to the journal table 400, accounting book information that associates the address of the recording area of the image data of the transaction slip 120, the acquired information concerning the details described in the transaction slip 120, and the administrative number. The information processing apparatus 100 thereby enables determination of whether the transaction slip 120 satisfies the search conditions and enables the identification of the storage site 130 storing the transaction slip 120.

One example of operation to update the accounting book information based on a corporation identification number at (14-3) in FIG. 14 will be described with reference to FIG. 16.

FIG. 16 is an explanatory diagram of one example of operation to update the accounting book information based on a corporation identification number. As depicted in FIG. 16, the information processing apparatus 100 analyses the image data of a transaction slip 120, acquires the corporation identification number "1234567891199" and transmits to the information accumulating apparatus 202, an inquiry about the corporation name (the company name) and the location that correspond to the corporation identification number "1234567891199". The information accumulating apparatus 202 refers to the company information table 800 and transmits to the information processing apparatus 100, the corporation name "●●●● MART" and the location that correspond to the corporation identification number "1234567891199".

The information processing apparatus 100 receives the corporation name "●●●● MART" and the location that correspond to the corporation identification number "1234567891199" from the information accumulating apparatus 202. The information processing apparatus 100 updates the accounting book information concerning the transaction slip 120 based on the received corporation name "●●●● MART" and the received location. The information processing apparatus 100 can thereby identify the company name and the like based on the corporation identification number even when the information processing apparatus 100 cannot acquire the company name and the like using character recognition.

One example of operation to update the accounting book information based on a logo at (14-3) in FIG. 14 will be described with reference to FIG. 17.

FIG. 17 is an explanatory diagram of one example of operation to update the accounting book information based on a logo. As depicted in FIG. 17, the information processing apparatus 100 analyzes the image data of a transaction slip 120 and extracts the image data of the logo of the transaction counterpart. The information processing apparatus 100 searches image data of previously scanned logos recorded in the logo information table 500, for image data that matches the extracted image data of the logo. If the information processing apparatus 100 finds matching image data, the information processing apparatus 100 acquires the company name as the name of the transaction counterpart and updates based on the acquired company name, the accounting book information related to the transaction slip 120.

In the example depicted in FIG. 17, the information processing apparatus 100 analyzes image data 1701 of the transaction slip 120 and extracts image data 1710 of the logo "▲▲▲▲▲" of the transaction counterpart. The information processing apparatus 100 compares the extracted image data 1710 with image data 1720 of the logo "▲▲▲▲▲" recorded in the logo information table 500 and extracted in the past from image data 1702 of the transaction slip 120.

Because the image data 1710 and the image data 1720 match, the information processing apparatus 100 acquires the company name "●●●● Mart Co., Ltd." that corresponds to the image data 1702. The information processing apparatus 100 updates the accounting book information related to the transaction slip 120, based on the acquired company name. The information processing apparatus 100 can thereby identify the company name based on the logo thereof even when the company name cannot be acquired using character recognition. The information processing apparatus 100 may identify the location of the company based on the logo.

One example of operation to receive input of information concerning details described in a transaction slip 120 at (14-4) in FIG. 14 will be described with reference to FIG. 18.

FIG. 18 is an explanatory diagram of one example of operation to receive input of information concerning details described in a transaction slip 120. As depicted in FIG. 18, the information processing apparatus 100 refers to the journal table 400 and causes the output apparatus 907-2 of the client apparatus 203-2 to display an input screen 1800. The input screen 1800 includes, for example, an image 1801 of the transaction slip 120. The input screen 1800 includes, for example, a box 1802 to input therein the type of the transaction slip 120 and a box 1803 to input therein the transaction date of the transaction slip 120. The input screen 1800 includes, for example, a box 1804 to input therein the transaction amount of the transaction slip 120, a box 1805 to input therein a comment as to whether tax is included, and a box 1806 to input therein the name of the transaction counterpart.

The client apparatus 203-2 receives input, of the information concerning the details described in the transaction slip 120, for each of the boxes 1802 to 1806 by operational input by the user and transmits the information to the information processing apparatus 100. The information processing apparatus 100 updates the accounting book information recorded in the journal table 400 using the received information concerning the details described in the transaction slip 120. The information processing apparatus 100 can thereby receive input of information concerning the details described in the transaction slip 120 and update the accounting book information even when the information concerning the details described in the transaction slip 120 cannot be identified using character recognition.

Although a case is described where the user of the client, apparatus 203-2 inputs information concerning details described in the transaction slip 120, the inputting of the information is not limited hereto. For example, the information processing apparatus 100 may display the information concerning the details described in the transaction slip 120 acquired using character recognition in the boxes 1802 to 1806 in the input screen 1800. The user of the client, apparatus 203-2 checks the information concerning the details described in the transaction slip 120 displayed in the boxes 1802 to 1806 and, when an error is present in the information concerning the details described in the transaction slip 120, inputs corrected content. The client apparatus 203-2 transmits the input content to the information processing apparatus 100. The information processing apparatus 100 updates the accounting book information recorded in the journal table 400 based on the received content. The information processing apparatus 100 can thereby receive correction to the information concerning the details described in the transaction slip 120 acquired using character recognition.

The information processing apparatus 100 may omit the execution of any of the operations depicted in FIGS. 16 to 18. For example, the information processing apparatus 100 may execute none of the operations depicted in FIGS. 16 and 17, and may receive the input of the information concerning the details described in the transaction slip 120 by the operation depicted in FIG. 18 to update the accounting book information. The information processing apparatus 100 may execute no character recognition for the image data of the transaction slip 120 and may acquire no information concerning the details described in the transaction slip 120.

One example of operation to receive input of search conditions at (14-5) in FIG. 14 will be described with reference to FIG. 19.

FIG. 19 is an explanatory diagram of one example of operation to receive input of search conditions. As depicted in FIG. 19, the information processing apparatus 100 causes the output apparatus 907-3 of the client apparatus 203-3 to display a journal screen 1900. The journal screen 1900 includes a display column 1901 to display therein the accounting book information. The journal screen 1900 also includes a box 1902 to input therein a period to be a search condition, a box 1903 to input therein a journalizing account to be a search condition, a box 1904 to input therein an amount to be a search condition, and a box 1905 to input therein an administrative number to be a search condition.

The journal screen 1900 includes a transaction slip search button 1906. The client apparatus 203-3 receives the search conditions input into the boxes 1902 to 1905 and, when the transaction slip search button 1906 is clicked, transmits the input search conditions to the information processing apparatus 100. The information processing apparatus 100 refers to the journal table 400 and searches for a transaction slip 120 that satisfies the received search conditions. The information processing apparatus 100 can thereby receive the input of the search conditions and identify a transaction slip 120 satisfying the search conditions and the storage site 130 storing the transaction slip 120.

One example of operation, at (14-6) in FIG. 14, to display the storage site 130 storing a transaction slip 120 satisfying search conditions will be described with reference to FIG. 20.

FIG. 20 is an explanatory diagram of one example of operation to display the storage site 130 storing the transaction slip 120. As depicted in FIG. 20, the information processing apparatus 100 causes the output-apparatus 907-3 of the client apparatus 203-3 to display a search result screen 2000 that shows the search result acquired by the search in FIG. 19.

The search result screen 2000 includes a display column 2001 that displays therein the information indicating the storage site 130. The search result screen 2000 also includes display columns 2002 to 2005 that display for each storage site 130, accounting book information corresponding to the transaction slip 120 satisfying the search conditions, and a display column 2006 that corresponds to determination of whether a transaction slip 120 is found. The search result screen 2000 includes a scan button 2007 and a search end button 2008.

The information processing apparatus 100 enables the user of the client apparatus 203-3 to know where a transaction slip 120 satisfying the search conditions is stored. Because the user of the client apparatus 203-3 can know the storage site 130 that stores the transaction slip 120 satisfying the search conditions, the burden of the searching work can be reduced.

One example of operation to scan a transaction slip 120 at (14-8) in FIG. 14 will be described with reference to FIG. 21.

Figure 21:
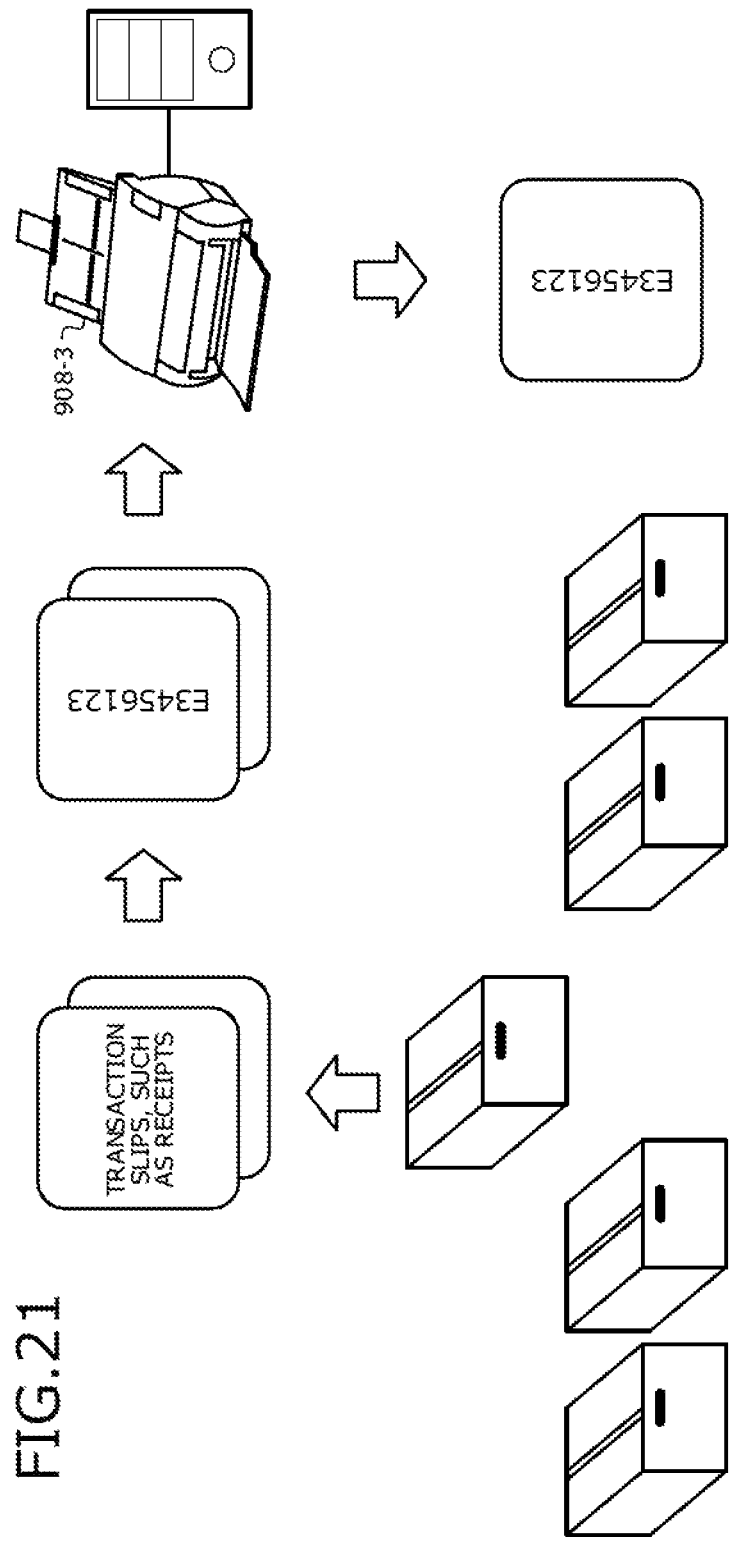
FIG. 21 is an explanatory diagram of one example of operation to scan a transaction slip 120.

FIG. 21 is an explanatory diagram of one example of operation to scan a transaction slip 120. As depicted in FIG. 21, the user of the client apparatus 203-3 refers to the search result screen displayed in FIG. 20, takes out the plural transaction slips 120 present in the storage site 130 storing the transaction slip 120 satisfying the search conditions, and sets the plural transaction slips 120 in the scanner 908-3. When the user of the client apparatus 203-3 sets the plural transaction slips 120 in the scanner 908-3, the user clicks the scan button 2007. The client apparatus 203-3 notifies the information processing apparatus 100 that the scan button 2007 has been clicked. When the information processing apparatus 100 receives the notice, the information processing apparatus 100 notifies the scanner 908-3 of the administrative numbers of the transaction slips 120 that satisfy the search conditions, initiating the start of scanning.

The scanner 908-3 optically reads the back of each of the set transaction slips 120 to acquire the administrative number of the transaction slip 120; detects based on the acquired administrative numbers, the transaction slips 120 satisfying the search conditions; and outputs detection notices. For example, the scanner 908-3 optically reads the back of a set transaction slip 120 to acquire the administrative number of the transaction slip 120 and when the acquired administrative number matches with any one of the administrative numbers of the transaction slips 120 satisfying the search conditions, suspends the scanning. When the scanning is suspended, the user of the client apparatus 203-3 can thereby take out and the transaction slip 120 satisfying the search conditions and scanned by the scanner 908-3.

The scanner 908-3 may include a mechanism to sort and eject the transaction slips 120 satisfying the search conditions and the transaction slips 120 not satisfying the search conditions separately from each other. With this mechanism, the scanner 908-3 does not need to suspend scanning each time a transaction slip 120 satisfying the search conditions is detected, and can efficiently detect the transaction slips 120 satisfying the search conditions.

The scanner 908-3 outputs a completion notice in response to the completion of the scanning of the set transaction slips 120. The client apparatus 203 transmits to the information processing apparatus 100, the detection notice or the completion notice output from the scanner 908. Each time the information processing apparatus 100 receives a detection notice or the completion notice, the information processing apparatus 100 updates the content of the display of the output apparatus 907-3 of the client apparatus 203-3 as described later with reference to FIGS. 22 to 24.

One example of operation executed in response to the detection of a transaction slip 120 at (14-9) in FIG. 14 will be described with reference to FIG. 22.

Figure 22:
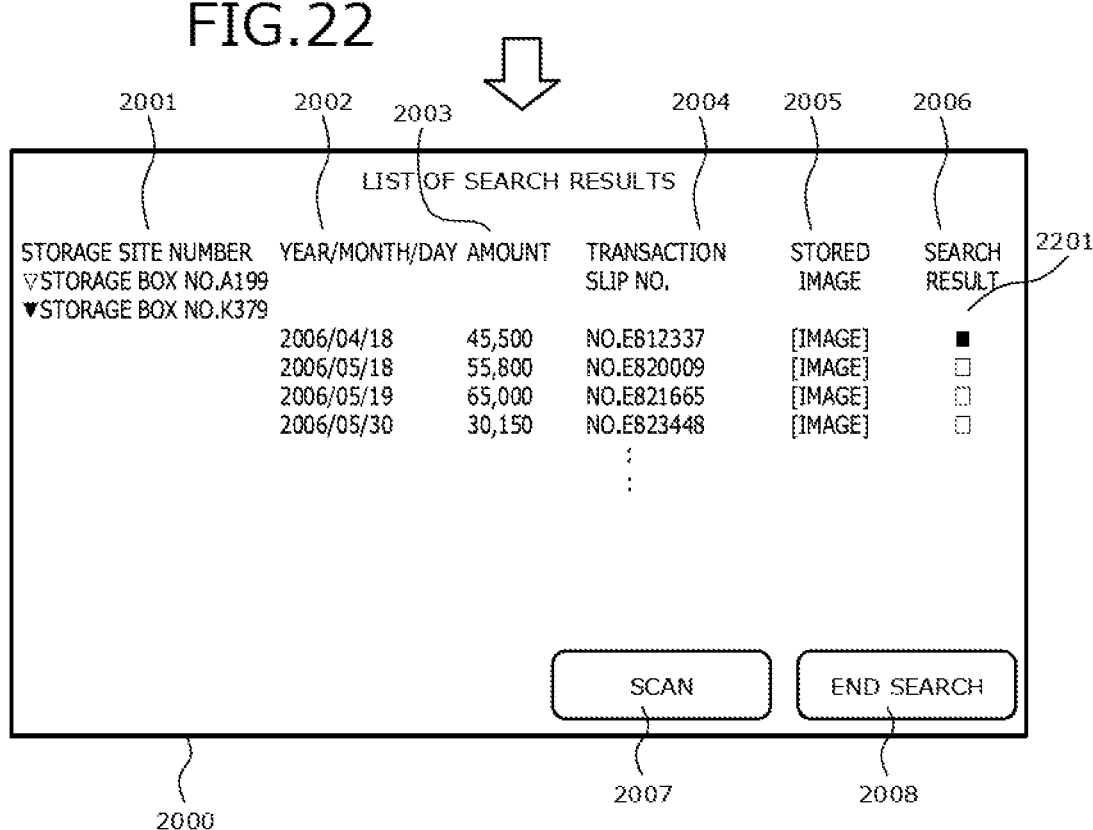
FIG. 22 is an explanatory diagram of one example of operation executed in response to detection of a transaction slip 120.

FIG. 22 is an explanatory diagram of one example of operation executed in response to the detection of a transaction slip 120. As depicted in FIG. 22, each time the information processing apparatus 100 receives a detection notice, the information processing apparatus 100 controls the client apparatus 203-3 to display in the display column 2006 corresponding to the detected transaction slip 120, a mark indicating that the transaction slip 120 has been detected. In the example depicted in FIG. 22, when the information processing apparatus 100 receives a detection notice for the transaction slip 120 with the administrative number "E812337", the information processing apparatus 100 controls the client apparatus 203-3 to cause the mark 2201 "■" to be displayed in the display column 2006 corresponding to the transaction slip 120 with the administrative number "E812337". The user of the client apparatus 203-3 can thereby know which transaction slip 120 the detected transaction slip 120 is and can know how many undetected transaction slips 120 are present.

One example of operation executed in response to the completion of the detection of the plural transaction slips 120 at (14-9) in FIG. 14 will be described with reference to FIG. 23.

Figure 23:
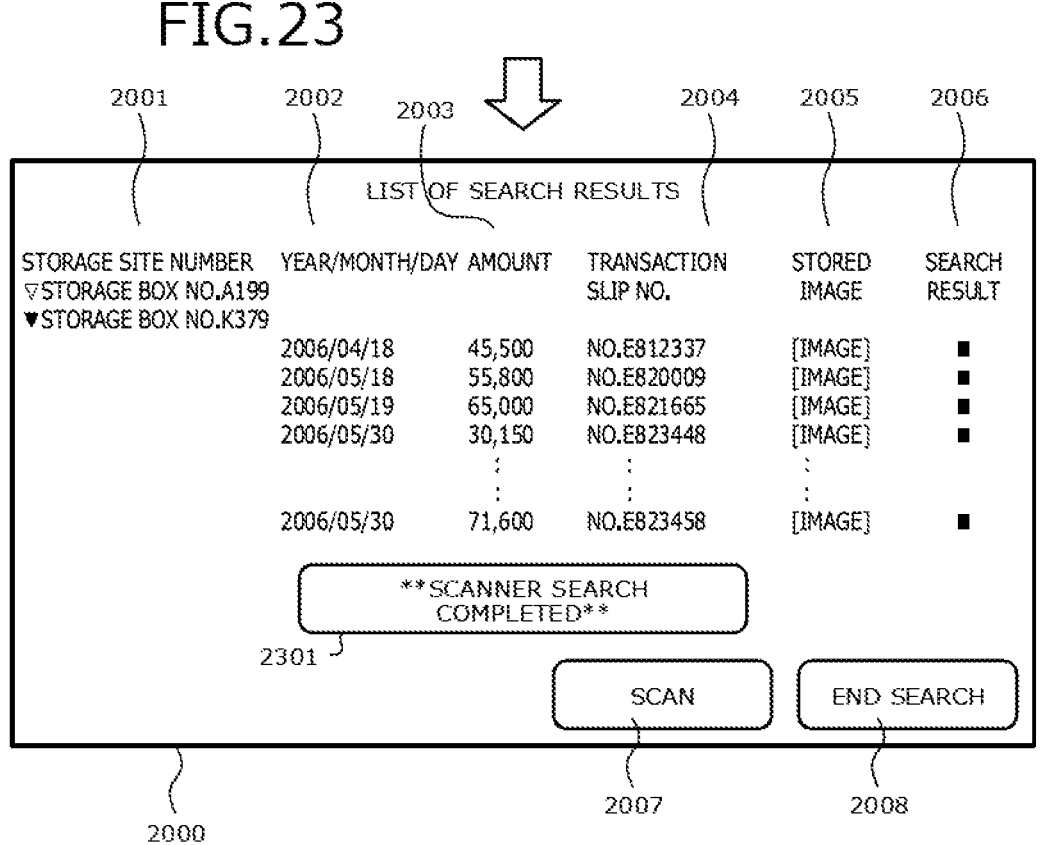
FIG. 23 is an explanatory diagram of one example of operation executed in response to completion of the detection of plural transaction slips 120.

FIG. 23 is an explanatory diagram of one example of operation executed in response to the completion of the detection of the plural transaction slips 120. As depicted in FIG. 23, the information processing apparatus 100 determines that based on the detection notices, the number of the detected transaction slips 120 is the number of the transaction slips 120 satisfying the search conditions and stored in the storage site 130. In response to the determination that the number of the detected transaction slips 120 is the number of the transaction slips 120 satisfying the search conditions and stored in the storage site 130, the information processing apparatus 100 controls the client apparatus 203-3 to display a message indicating search completion. The user of the client apparatus 203-3 can thereby know that all the transaction slips 120 satisfying the search conditions have been detected and when other transaction slips 120 to be searched for are present, can set such transaction slips 120 in the scanner 908-3.

In response to the determination that the number of the detected transaction slips 120 is the number of the transaction slips 120 satisfying the search conditions and stored in the storage site 130, the information processing apparatus 100 outputs to the scanner 908-3, an instruction to discontinue the scanning. Thus, the information processing apparatus 100 does not cause the scanner 908-3 to execute scanning operations for the set transaction slips 120 after all the transaction slips 120 satisfying the search conditions have been detected, and the load on the scanner 908-3 can be reduced, enabling other transaction slips 120 to be set in the scanner 908-3.

One example of operation executed in response to missed detection of a transaction slip 120 at (14-9) in FIG. 14 will be described with reference to FIG. 24.

Figure 24:
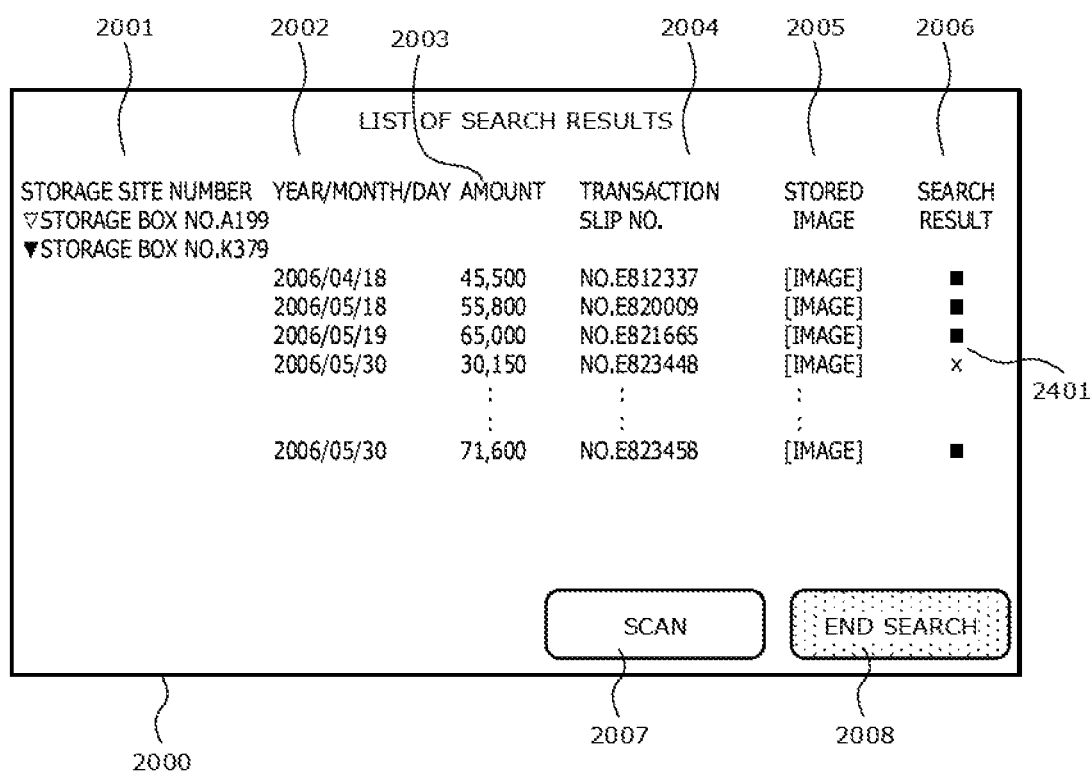
FIG. 24 is an explanatory diagram of one example of operation executed in response to missed detection of a transaction slip 120.

FIG. 24 is an explanatory diagram of one example of operation executed in response to missed detection of a transaction slip 120. As depicted in FIG. 24, when the information processing apparatus 100 receives the completion notice, the information processing apparatus 100 controls the client apparatus 203-3 to display information that corresponds to the result of the comparison between the number of the detected transaction slips 120 and the number of the transaction slips 120 satisfying the search conditions.

In the example depicted in FIG. 24, the information processing apparatus 100 displays indication that the number of the detected transaction slips 120 and the number of the transaction slips 120 satisfying the search conditions differ, as the information corresponding to the comparison result, and causes a mark 2401 "x" to be displayed that indicates which transaction slip 120 has not been detected. The user of the client apparatus 203-3 can thereby know that undetected transaction slips 120 are present among the transaction slips 120 satisfying the search conditions.

Basically, when the information processing apparatus 100 receives the completion notice, the information processing apparatus 100 controls the client apparatus 203-3 to change the color of the search end button 2008 to prompt clicking of the search end button 2008. When the user of the client apparatus 203-3 clicks the search end button 2008, the information processing apparatus 100 controls the client apparatus 203-3 to display the mark 2401 "x" that indicates which transaction slip 120 has not been detected.

When the user of the client apparatus 203-3 is prompted to click the search end button 2008, the user of the client apparatus 203-3 may consider the possibility that the undetected transaction slip 120 may be present in a storage site 130 that is different from the storage site whose transaction slips 120 are currently scanned. When the user of the client apparatus 203-3 considers a different storage site 130, the user sets the transaction slips 120 stored in the different storage site 130 in the scanner 908-3 and clicks the scan button 2007.

When the user of the client apparatus 203-3 clicks the scan button 2007, the information processing apparatus 100 causes the scanner 908-3 to scan the transaction slips 120 stored in the different storage site 130. Here, the information processing apparatus 100 and the scanner 908-3 do not need to recognize that the scanning is for the transaction slips 120 stored in a different storage site 130. In other words, the information processing apparatus 100 and the scanner 908-3 may recognize the scanning to a continuation of the scanning for the transaction slips 120 stored in the same storage site 130 as that before the completion notice was output.

A case is described above with reference to FIGS. 21 to 24 where the user of the client apparatus 203-3 refers to the search result screen 2000 displayed in FIG. 20, takes out the plural transaction slips 120 present in the storage site 130, and sets the transaction slips 120 in the scanner 908-3. The procedure is however not limited hereto. For example, the user of the client apparatus 203-3 may take out the plural transaction slips 120 present in an arbitrary storage site 130, set the plural transaction slips 120 in the scanner 908-3, and input a transaction date, a transaction amount, a type, or an administrative number of a transaction slip as search conditions. Thus, the information processing apparatus 100 does not need to execute the process of identifying the storage site 130 and can cause the scanner 908-3 to detect the transaction slips 120 satisfying the search conditions input at the client apparatus 203-3.

One example of a procedure for a preparatory process will be described with reference to FIGS. 25 and 26.

Figure 25:
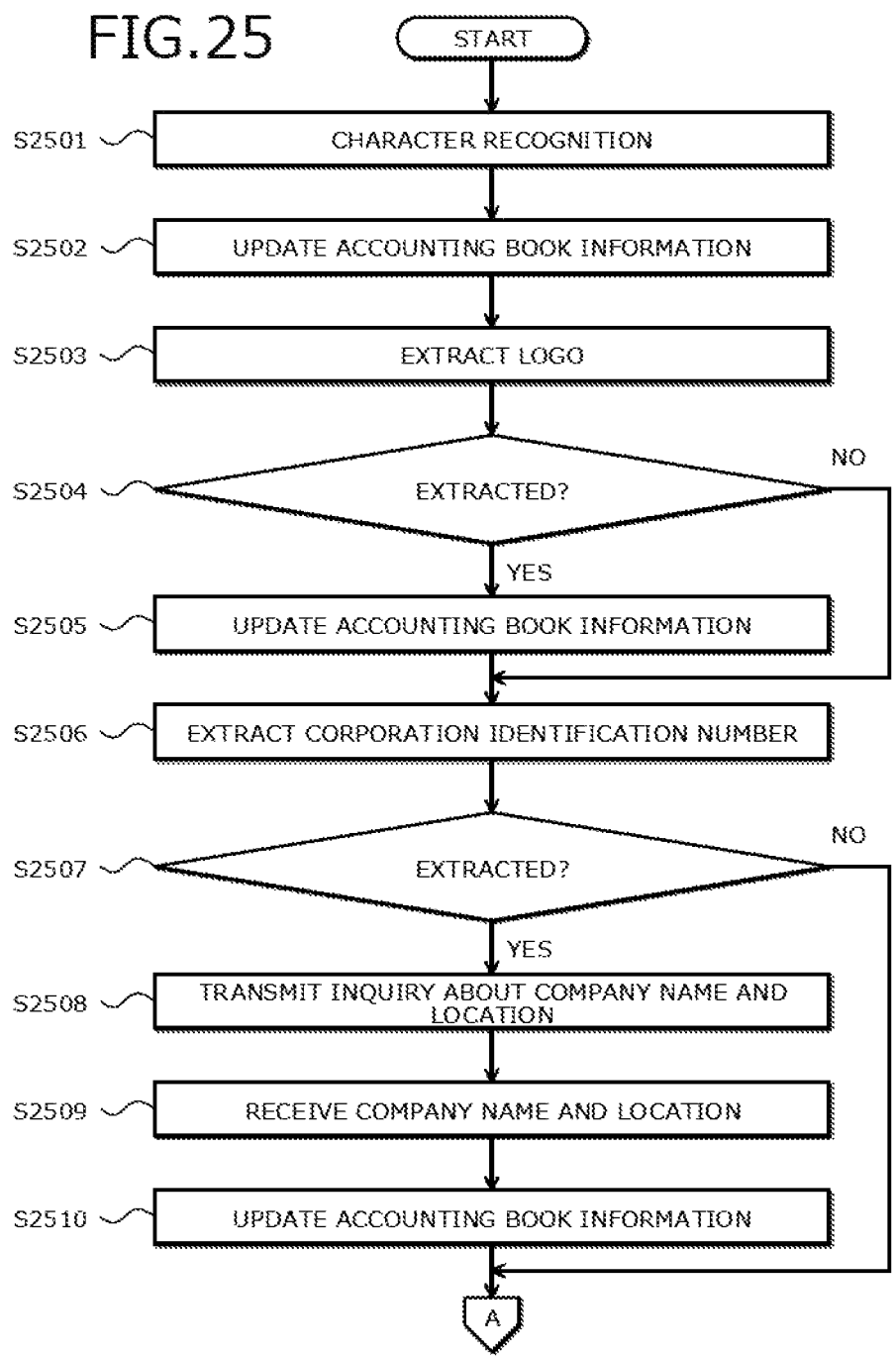
FIGS. 25 and 26 are flowcharts representing one example of a procedure for a preparatory process.
Figure 26:
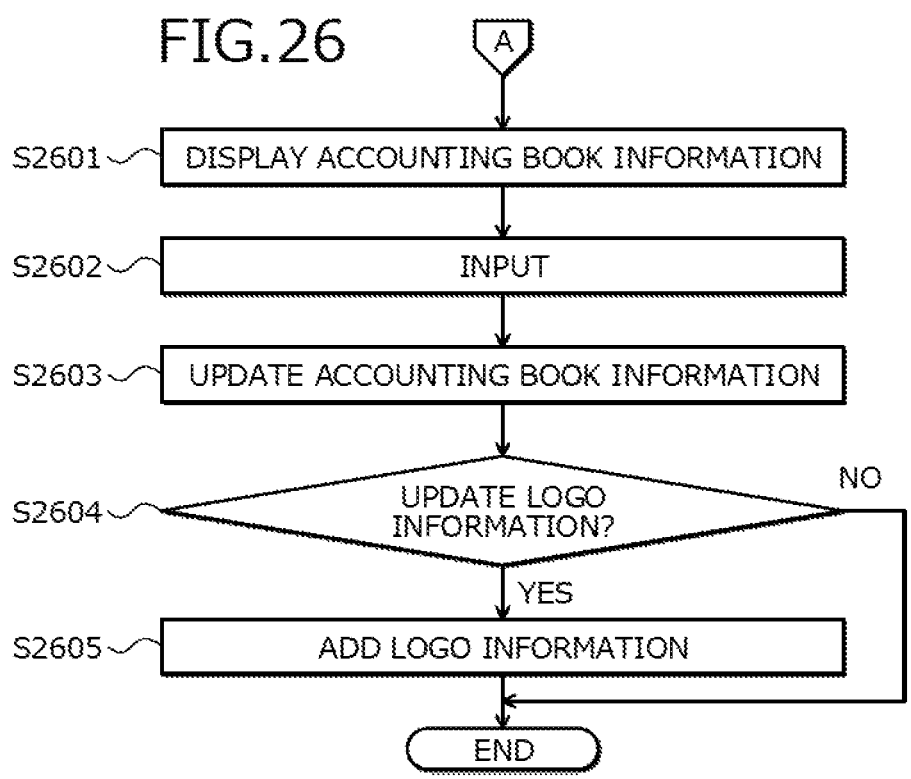

FIGS. 25 and 26 are flowcharts representing one example of a procedure for the preparatory process. In FIG. 25, the information processing apparatus 100 acquires image data of a transaction slip 120 and the information identifying the transaction slip, executes character recognition with respect to the image data of the transaction slip 120, and acquires the information concerning the details described in the transaction slip 120 (step S2501). The information processing apparatus 100 updates the journal table 400 based on the acquired information concerning details described in the transaction slip 120 (step S2502). Here, the information processing apparatus 100 may further identify based on the information concerning the details described in the transaction slip 120, information indicating the storage site 130 of the transaction slip 120 and update the journal table 400.

The information processing apparatus 100 analyzes the image data of the transaction slip 120 and extracts image data of a logo in the transaction slip 120 (step S2503). The information processing apparatus 100 determines whether image data of a logo has been extracted (step S2504). If the information processing apparatus 100 determines that no image data has been extracted (step S2504: NO), the information processing apparatus 100 advances to the operation at step S2506.

On the other hand, if the information processing apparatus 100 determines that the image data has been extracted (step S2504: YES), the information processing apparatus 100 refers to the logo information table 500 and identifies the name of the transaction counterpart that corresponds to the extracted image data of the logo and updates the journal table 400 (step S2505).

The information processing apparatus 100 analyzes the image data of the transaction slip 120 and extracts the corporation identification number of the transaction counterpart described in the transaction slip 120 (step S2506). The information processing apparatus 100 determines whether the corporation identification number has been extracted (step S2507). If the information processing apparatus 100 determines that the corporation identification number has not been extracted (step S2507: NO), the information processing apparatus 100 advances to the operation at step S2601 in FIG. 26.

On the other hand, if the information processing apparatus 100 determines that the corporation identification number has been extracted (step S2507: YES), the information processing apparatus 100 transmits to the information accumulating apparatus 202, an inquiry about the company name and the location that correspond to the extracted corporation identification number (step S2508). The information processing apparatus 100 receives from the information accumulating apparatus 202, the company name and the location that correspond to the extracted corporation identification number (step S2509).

The information processing apparatus 100 updates the journal table 400 based on the received company name and the location (step S2510) and advances to the operation at step S2601 in FIG. 26.

In FIG. 26, the information processing apparatus 100 displays the accounting book information recorded in the journal table 400 (step S2601). The information processing apparatus 100 receives input of information concerning the details described in the transaction slip 120 (step S2602). The information processing apparatus 100 updates the journal table 400 based on the input-information concerning the details described in the transaction slip 120 (step S2603).

The information processing apparatus 100 determines whether the information processing apparatus 100 is to update the logo information (step S2604). If the information processing apparatus 100 determines not to update the logo information (step S2604: NO), the information processing apparatus 100 causes the preparatory process to come to an end.

On the other hand, if the information processing apparatus 100 determines to update the logo information (step S2604: YES), the information processing apparatus 100 adds the logo information to the logo information table 500 (step S2605). The information processing apparatus 100 can thereby print the information identifying the transaction slip 120 on the back of the transaction slip 120 and can generate the accounting book information concerning the transaction slip 120 and update the journal table 400.

One example of a procedure for a search process will be described with reference to FIG. 27.

Figure 27:
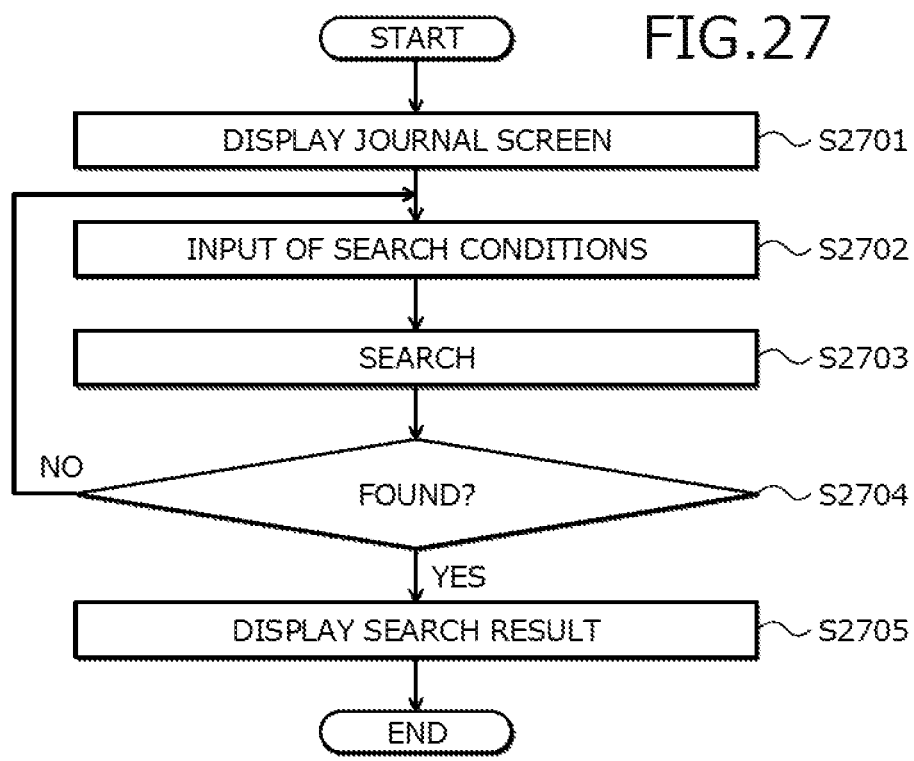
FIG. 27 is a flowchart of one example of a procedure for a search process.

FIG. 27 is a flowchart of one example of a procedure for the search process. In FIG. 27, the information processing apparatus 100 displays a journal screen based on the journal table 400 (step S2701). The information processing apparatus 100 receives input of search conditions (step S2702). The information processing apparatus 100 searches for a transaction slip 120 that, satisfies the input search conditions, based on the journal table 400 (step S2703).

The information processing apparatus 100 determines whether a transaction slip 120 satisfying the input search conditions has been found (step S2704). If the information processing apparatus 100 determines that no transaction slip 120 has been found (step S2704: NO), the information processing apparatus 100 returns to the operation at step S2702.

On the other hand, if the information processing apparatus 100 determines that a transaction slip 120 has been found (step S2704: YES), the information processing apparatus 100 displays a search result associating the information identifying the transaction slip 120 satisfying the search conditions and information indicating the storage site 130 storing the transaction slip 120 satisfying the search conditions (step S2705). The information processing apparatus 100 causes the search process to come to an end. The information processing apparatus 100 can thereby output the information identifying the transaction slip 120 satisfying the search conditions and the information indicating the storage site 130 storing the transaction slip 120 satisfying the search conditions.

One example of a procedure for a detection process will be described with reference to FIG. 28.

Figure 28:
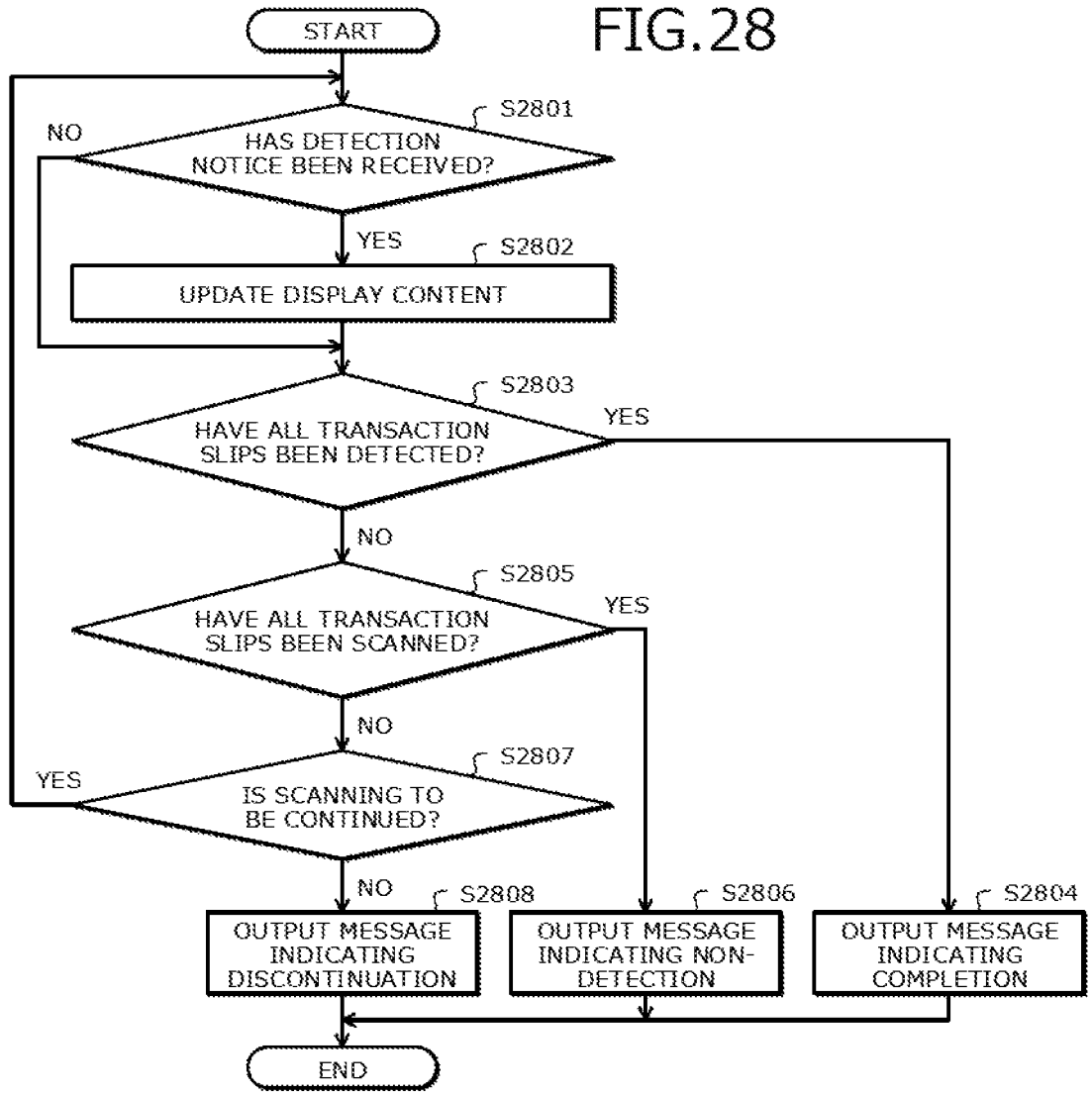
FIG. 28 is a flowchart of one example of a procedure for a detection process.

FIG. 28 is a flowchart of one example of a procedure for the detection process. In FIG. 28, the information processing apparatus 100 determines whether a detection notice from the scanner had been received (step S2801). If the information processing apparatus 100 determines that no detection notice from the scanner has been received (step S2801: NO), the information processing apparatus 100 advances to the operation at step S2803.

If the information processing apparatus 100 determines that a detection notice from the scanner has been received (step S2801: YES), the information processing apparatus 100 updates the display content based on the detection notice (step S2802). The information processing apparatus 100 determines whether all the transaction slips 120 have been detected (step S2803). If the information processing apparatus 100 determines that all the transaction slips 120 have been detected (step S2803: YES), the information processing apparatus 100 outputs a message indicating completion (step S2804) and causes the procedure for the detection process to come to an end.

On the other hand, if the information processing apparatus 100 determines that an undetected transaction slips 120 is present (step S2303: NO), the information processing apparatus 100 determines whether all the transaction slips 120 have been scanned (step S2805). If the information processing apparatus 100 determines that all the transaction slips 120 have been scanned (step S2805: YES), the information processing apparatus 100 outputs a message indicating non-detection and including information identifying undetected transaction slips 120, and the like (step S2806) and causes the procedure for the detection process to come to an end.

On the other hand, if the information processing apparatus 100 determines that the transaction slips 120 not yet scanned are present (step S2805: NO), the information processing apparatus 100 determines whether the scanning is to be continued, according to a clicking of the scan button 2007 meaning continuation or a clicking of the search end button 2008 meaning discontinuation (step S2807). If the information processing apparatus 100 determines that the scanning is to be continued (step S2807: YES), the information processing apparatus 100 returns to the operation at step S2801.

On the other hand, if the information processing apparatus 100 determines that the scanning is to be discontinued (step S2807: NO), the information processing apparatus 100 outputs a message indicating discontinuation and including information identifying the undetected transaction slips 120 and the like, at time of discontinuation (step S2808) and causes the procedure for the detection process to come to an end. The information processing apparatus 100 can thereby detect the transaction slips 120 satisfying the search conditions and output the detection state of the transaction slips 120 satisfying the search conditions.

As described, according to the information processing apparatus 100, the transaction slips 120 satisfying the received search conditions and the storage site 130 of the transaction slips 120 can be identified by referring to the recording unit 1001. According to the information processing apparatus 100, the information identifying the transaction slips 120 stored in the identified storage sites 130 of the identified transaction slips 120 can be output being associated with the information indicating the corresponding storage site 130. The information processing apparatus 100 enables the worker performing the searching work to know which storage sites 130 store transaction slips 120 satisfying the search conditions, how many transaction slips 120 satisfying the search conditions are present in each of the storage sites 130, and what transaction slips 120 are present in the respective storage sites 130. As a result, the burden of searching for a transaction slip 120 can be reduced.

According to the information processing apparatus 100, an instruction to discontinue scanning can be output to the scanner in response to a determination that based on the detection notices from the scanner, the number of the detected transaction slips 120 is the number of the identified transaction slips 120 stored in the identified storage sites 130. The information processing apparatus 100 can thereby discontinue the operation of the scanner when all the transaction slips 120 satisfying the search conditions have been detected. The information processing apparatus 100 enables the worker performing the searching work to know that all the transaction slips 120 satisfying the search conditions have been detected.

According to the information processing apparatus 100, when a completion notice is received from the scanner, based on the detection notices, information can be output that corresponds to a result of comparison between the number of the detected transaction slips 120 and the number of the identified transaction slips 120 stored in the identified storage sites 130. The information processing apparatus 100 can thereby enable the worker performing the searching work to know whether an transaction slip 120 not yet detected by the scanner is present.

According to the information processing apparatus 100, when a detection notice is received from the scanner, information indicating that a transaction slip 120 has been detected can be output associated with information identifying the detected transaction slip 120. The information processing apparatus 100 can thereby enable the worker performing the searching work to know what transaction slip 120 has been detected, each time a transaction slip 120 is detected. As a result, the information processing apparatus 100 can reduce the burden of searching for transaction slips 120.

On the back of a transaction slip 120, information identifying the transaction slip 120 is printed. The scanner can recognize the information identifying the transaction slip 120 and to detect a transaction slip 120 searched for, by scanning the transaction slip 120. The worker performing the searching work can refer to the information identifying the transaction slip 120 that is printed on the back of the transaction slip 120 and thereby check whether the transaction slip 120 detected by the scanner is a transaction slip 120 satisfying the search conditions.

According to the information processing apparatus 100, the image data of the transaction slip 120 and the information identifying the transaction slip 120 output from the scanner can be received, the received image data can be output, and the input of the information concerning the details described in the transaction slip 120 whose image data is output can be received. The information processing apparatus 100 can thereby enable determination of whether the transaction slip 120 satisfies the search conditions and enables the identification of the storage site 130 storing the transaction slip 120.

According to the information processing apparatus 100, the information of the transaction slip 120 is generated and includes at least the information identifying the received transaction slip 120 and the information concerning the details described in the transaction slip 120, acquired by analyzing the received image data. According to the information processing apparatus 100, the generated information of the transaction slip 120 can be associated with the information indicating the storage site 130 of the transaction slip 120 and recorded to the recording unit 1001. The information processing apparatus 100 thereby enables determination of whether the transaction slip 120 satisfies the search conditions and enables identification of the storage site 130 storing the transaction slip 120.

According to the information processing apparatus 100, the corporation identification number of the transaction counterpart can be extracted from the received image data, inquiry about the name of the corporation corresponding to the extracted corporation identification number can be made to the information accumulating apparatus 202, and the name of the corporation can be received from the information accumulating apparatus 202. The information processing apparatus 100 can thereby identify the company name based on the corporation identification number even when the company name cannot be acquired using character recognition.

According to the information processing apparatus 100, the logo of the transaction counterpart can be extracted from the received image data and the name of the transaction counterpart corresponding to the extracted logo can be acquired by referring to the recording unit 1001. The information processing apparatus 100 can thereby identify the company name based on the logo even when the company name cannot be acquired using character recognition.

According to the information processing apparatus 100, when the extracted logo is not recorded in the recording unit 1001, input of the name of the transaction counterpart corresponding to the extracted logo can be received, and the extracted logo and the input name of the transaction counterpart can be associated and recorded to the recording unit 1001. The information processing apparatus 100 can thereby enable identification of the company name that corresponds to the logo in subsequent search sessions.

According to the information processing apparatus 100, the transaction date described in the transaction slip 120 of the source of image data can be extracted from the received image data and the storage site 130 corresponding to the extracted transaction date can be identified by referring to the recording unit 1001. Thus, before the storage of a transaction slip 120, the information processing apparatus 100 can identify a storage site 130 to store the transaction slip 120 and enable the worker performing the storage work to store the transaction slip 120 to know the storage site 130, and thereby supports the storage work. When the information processing apparatus 100 does not identify the storage site 130 and the worker performing the storage work determines the storage site 130, the information processing apparatus 100 receives input of information indicating the determined storage site 130 and records therein the information indicating the storage site 130 of the transaction slip 120.

According to the information processing apparatus 100, a combination of a document having at least a transaction amount described therein and a document having at least transaction details described therein can be employed as the transaction slip 120. The information processing apparatus 100 can thereby records therein information concerning the transaction details and can enable the information to be referred to when the accounting books and the like are checked for improper or fraudulent description.

According to the information processing apparatus 100, a character string indicating the transaction slip 120 may be employed as the information identifying the transaction slip 120. Thus, rather than information such as a bar code that is difficult for the worker performing the searching work to seek a transaction slip 120 to read, the information processing apparatus 100 can employ a character string that can easily be read by the worker, and can reduce the burden of the searching work.

According to the information processing apparatus 100, an instruction to discontinue the scanning can be output to the scanner in response to a determination that based on the detection notices from the scanner, the number of the detected transaction slips 120 is the number of the transaction slips 120 searched for and recorded associated with a specific storage site 130. The information processing apparatus 100 can thereby discontinue the operation of the scanner when all the transaction slips 120 satisfying the search conditions have been detected. The information processing apparatus 100 can enable the worker performing the searching work to know that all the transaction slips 120 satisfying the search conditions have been detected. The worker performing the searching work does not need to check the transaction slips 120 by visual observation because the scanner detects the transaction slips 120, and the burden of the searching work can be reduced.

According to the information processing apparatus 100, when a completion notice from the scanner is received, information can be output that corresponds to the result of the comparison of the number of the detected transaction slips 120 and the number of the transaction slips 120 searched for and recorded associated with a specific storage site 130, based on the detection result. The information processing apparatus 100 can thereby enable the worker performing the searching work to know whether an undetected transaction slip 120 is present using the scanner. Because the worker performing the searching work detects the transaction slip 120 using the scanner, the worker does not need to check the transaction slip 120 by visual observation and the burden of the searching work can be reduced.

The scanner enables the information identifying the transaction slip 120 to be printed on the back of the transaction slip 120. The worker performing the searching work can thereby check whether the information identifying the transaction slips 120 satisfying the search conditions output by the information processing apparatus 100 and the information identifying the transaction slip 120 printed on the back of the transaction slip 120 detected by the scanner match. The worker performing the searching work can determine whether the transaction slips 120 satisfying the search conditions are correctly detected based on whether the information matches. Even when plural transaction slips 120 describing similar details are present, the worker performing the searching work can suppress occurrence of a mix-up of the transaction slips 120, based on the information printed on the back of each of the transaction slips 120. In this manner, the worker performing the searching work can precisely seek the transaction slips 120 satisfying the search conditions.

According to the information processing apparatus 100, information concerning the details described in the transaction slip 120 satisfying the search conditions and the image data of the transaction slip 120 can be output. The information processing apparatus 100 can thereby enable the worker performing the searching work to correct the search conditions and search for a transaction slip 120 satisfying the corrected search conditions. As a result, the worker performing the searching work can adjust the search conditions before the original of the transaction slip 120 is sought and can suppress execution of unnecessary searching work. The information processing apparatus 100 enables the worker performing the searching work to determine whether the transaction slips 120 satisfying the search conditions have been correctly detected, by comparing the transaction slip 120 detected by the scanner and the image data of the transaction slip 120.

According to the information processing apparatus 100, after printing the information identifying a transaction slip 120 on the back of the transaction slip 120, the image data of the transaction slip 120 can be associated with the information identifying the transaction slip 120 and recorded. The user of the information processing apparatus 100 can thereby check the details described in the transaction slip 120 from the image data of the transaction slip 120, based on the information printed on the back of the transaction slip 120 even when the original of the transaction slip 120 is physically damaged, defaced, faded in color due to exposure to light, or the like. The user of the information processing apparatus 100 can request the transaction counterpart to again issue the transaction slip 120 based on the reliability that the transaction slip 120 is same as the transaction slip 120 of the image data corresponding to the information even when the original of the transaction slip 120 having the information printed on the back or the like thereof is physically damaged or the like.

The transaction slip search method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

According to one aspect of the present invention, an effect is achieved in that the burden of searching for a transaction slip can be reduced.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

(Note 1) An information processing apparatus comprising: a processor that executes a process including; receiving a search condition; identifying, by a computer, a transaction slip satisfying the search condition for each storage site of the transaction slip by referring to a recording device that stores information of transaction slips in association with the information indicating storage sites of the transaction slips; and outputting information of the identified transaction slip in association with the information indicating the storage site of the identified transaction slip.

(Note 2) A non-transitory, computer-readable recording medium storing therein a transaction slip search program that causes a computer to execute a process comprising: receiving a search condition; identifying a transaction slip satisfying the search condition for each storage site of the transaction slip by referring to a recording device that stores information of transaction slips in association with the information indicating storage sites of the transaction slips; and outputting information of the identified transaction slip in association with the information indicating the storage site of the identified transaction slip.

(Note 3) A transaction slip search method comprising: receiving, by a computer, a detection notice output corresponding to detection of a transaction slip searched for and stored in a storage site, the detection notice being from a scanner that detects the transaction slip searched for by scanning transaction slips; and outputting, by the computer to the scanner, an instruction to discontinue scanning, the computer outputting the instruction when determining that based on the received detection notice, all transaction slips searched for and recorded associated with a specific storage site have been detected.

(Note 4) An information processing apparatus comprising: a control circuit configured to receive a detection notice output corresponding to detection of a transaction slip searched for and stored in a storage site, the detection notice being from a scanner that, detects the transaction slip searched for by scanning transaction slips, wherein the control circuit is further configured to output to the scanner, an instruction to discontinue scanning, the computer outputting the instruction when determining that based on the received detection notice, all transaction slips searched for and recorded associated with a specific storage site have been detected.

(Note 5) A non-transitory, computer-readable recording medium storing therein a transaction slip search program that causes a computer to execute a process comprising: receiving a detection notice output corresponding to detection of a transaction slip searched for and stored in a storage site, the detection notice being from a scanner that detects the transaction slip searched for by scanning transaction slips; and outputting to the scanner, an instruction to discontinue scanning, the computer outputting the instruction when determining that based on the received detection notice, all transaction slips searched for and recorded associated with a specific storage site have been detected.

(Note 6) A transaction slip search method comprising: receiving, by a computer, a detection notice that includes information identifying a transaction slip searched for, the detection notice being output corresponding to detection of the transaction slip searched for and stored in a storage site, and the detection notice being from a scanner that detects the transaction slip searched for by scanning transaction slips; receiving, by the computer, a completion notice from the scanner and output corresponding to completion of scanning of the transaction slips stored in the storage site; and outputting, by the computer when the completion notice is received and based on the received detection notice, information indicating a state of detection of the transaction slip searched for and recorded associated with a specific storage site.

(Note 7) An information processing apparatus comprising: a control circuit configured to receive a detection notice that includes information identifying a transaction slip searched for, the detection notice being output corresponding to detection of the transaction slip searched for and stored in a storage site, and the detection notice being from a scanner that detects the transaction slip searched for by scanning transaction slips, wherein the control circuit is further configured to receive a completion notice from the scanner and output corresponding to completion of scanning of the transaction slips stored in the storage site, and the control circuit, when receiving the completion notice and based on the received detection notice, outputs information indicating a state of detection of the transaction slip searched for and recorded associated with a specific storage site.

(Note 8) A non-transitory, computer-readable recording medium storing therein a transaction slip search program that causes a computer to execute a process comprising: receiving a detection notice that includes information identifying a transaction slip searched for, the detection notice being output corresponding to detection of the transaction slip searched for and stored in a storage site, and the detection notice being from a scanner that detects the transaction slip searched for by scanning transaction slips; receiving a completion notice from the scanner and output corresponding to completion of scanning of the transaction slips stored in the storage site; and outputting when the completion notice is received and based on the received detection notice, information indicating a state of detection of the transaction slip searched for and recorded associated with a specific storage site.

What is claimed is:

1. A transaction slip search method comprising:
   receiving a search condition by a computer;
   identifying, by the computer and by referring to a recording device that stores information of transaction slips in association with information indicating storage sites of the transaction slips, a transaction slip satisfying the search condition for each storage site;
   receiving, by the computer, a detection notice including the information identifying the transaction slip and output upon each detection of the transaction slip, the detection notice being output from a scanner that scans the transaction slips and detects the transaction slip searched for; and
   associating and outputting, by the computer and each time the detection notice is received, the information of the identified transaction slip and information indicating that the transaction slip is detected.

2. The transaction slip search method according to claim 1, further comprising:
   outputting, by the computer to the scanner, an instruction to discontinue scanning, the computer outputting the instruction when determining that based on the received detection notice, all identified transaction slips have been detected for a storage site.

3. The transaction slip search method according to claim 1, further comprising:
   receiving, by the computer, a completion notice from the scanner and output corresponding to completion of scanning the transaction slips stored in a storage site; and
   outputting, by the computer when the completion notice is received and based on the received detection notice, information indicating a state of detection of identified transaction slips stored in the identified storage site.

4. The transaction slip search method according to claim 2, wherein
   the information identifying the transaction slip is printed on the transaction slip, and
   the scanner detects the transaction slip searched for, by scanning the transaction slip and recognizing the information identifying the transaction slip, printed on the transaction slip.

5. The transaction slip search method according to claim 1, further comprising:
   receiving, by the computer, image data of a transaction slip and information identifying the transaction slip, the image data being output from a scanner that acquires the image data by scanning the transaction slip and that prints the information identifying the transaction slip on the transaction slip;
   outputting, by the computer, the received image data and receiving, by the computer, input of information concerning a detail described in the transaction slip for which the image data is output; and
   associating and recording to the recording device, by the computer, the received information identifying the transaction slip, information of the transaction slip including the information concerning a detail described in the transaction slip for which the input is received, and information indicating a storage site of the transaction slip.

6. A transaction slip search method comprising:
   receiving, by a computer, image data of a transaction slip and information identifying the transaction slip, the image data being output from a scanner that acquires the image data of the transaction slip by scanning the transaction slip and that prints the information identifying the transaction slip on the transaction slip;
   associating and recording to a recording device, by the computer, the received information identifying the transaction slip, information of the transaction slip including information that concerns a detail described in the transaction slip and is acquired by analyzing the received image data, and information indicating a storage site of the transaction slip;
   receiving a search condition by the computer;
   identifying, by the computer and by referring to the recording device that stores information of transaction slips in association with information indicating storage sites of the transaction slips, a transaction slip satisfying the search condition for each storage site; and
   outputting information of the identified transaction slip satisfying the search condition in association with the information indicating the storage site of the identified transaction slip.

7. The transaction slip search method according to claim 6, further comprising:
   extracting, from the received image data and by the computer, a corporation identification number of a transaction counterpart; and
   making an inquiry, by the computer and about a name of a corporation corresponding to the extracted corporation identification number, the computer making the inquiry to an information accumulating apparatus associating and recording therein the name of the corporation and the corporation identification number, the computer receiving the name of the corporation from the information accumulating apparatus, wherein the associating and recording to the recording device includes associating and recording to the recording device, the received information identifying the transaction slip, the information of the transaction slip including the received name of the corporation, and the information indicating the storage site of the transaction slip.

8. The transaction slip search method according to claim 6, further comprising:

extracting, from the received image data and by the computer, a logo of a transaction counterpart; and identifying, by the computer, a name of the transaction counterpart corresponding to the extracted logo by referring to the recording device recording associated therein the name of the transaction counterpart and the logo of the transaction counterpart, wherein the associating and recording includes associating and recording to the recording device, the received information identifying the transaction slip, the information of the transaction slip including the identified name of the transaction counterpart, and the information indicating the storage site of the transaction slip.

9. The transaction slip search method according to claim 8, further comprising:

receiving, by the computer, input of the name of the transaction counterpart corresponding to the extracted logo, when the extracted logo is not recorded in the recording device; and associating and recording to the recording device, by the computer, the extracted logo and the input name of the transaction counterpart.

10. The transaction slip search method according to claim 6, further comprising:

extracting, from the received image data and by the computer, a transaction date described in the transaction slip, which is an acquisition source of the image data; and identifying, by the computer, a storage site corresponding to the extracted transaction date by referring to the recording device recording associated therein a period and the storage site of the transaction slip in which the described transaction date is within the period, wherein the associating and recording includes associating and recording to the recording device, the information of the transaction slip including the received information indicating the transaction slip and the information indicating the identified storage site.

11. The transaction slip search method according to claim 1, wherein the transaction slip is a combination of a document having a transaction amount described therein and a document having a transaction detail described therein.

12. The transaction slip search method according to claim 1, wherein the information identifying the transaction slip is a character string representing the transaction slip.

* * * * *